(12) United States Patent
Ishigami et al.

(10) Patent No.: US 9,864,064 B2
(45) Date of Patent: Jan. 9, 2018

(54) POSITIONING DEVICE

(75) Inventors: Tadatomi Ishigami, Tokyo (JP);
Atsushi Maeda, Tokyo (JP); Masatoshi Fujii, Tokyo (JP); Hirokazu Chiyonobu, Tokyo (JP); Kohei Fujimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 445 days.

(21) Appl. No.: 14/406,236

(22) PCT Filed: Jun. 27, 2012

(86) PCT No.: PCT/JP2012/066347
§ 371 (c)(1),
(2), (4) Date: Dec. 8, 2014

(87) PCT Pub. No.: WO2014/002211
PCT Pub. Date: Jan. 3, 2014

(65) Prior Publication Data
US 2015/0149073 A1   May 28, 2015

(51) Int. Cl.
*G01S 19/13* (2010.01)
*G01C 21/30* (2006.01)
(Continued)

(52) U.S. Cl.
CPC .............. *G01S 19/13* (2013.01); *G01C 21/28* (2013.01); *G01C 21/30* (2013.01); *G01S 19/22* (2013.01); *G01S 19/42* (2013.01)

(58) Field of Classification Search
CPC ......... G06F 17/30241; G06F 17/30259; G06F 17/30271; G01C 21/28; G01C 21/30
See application file for complete search history.

(56) References Cited

U.S. PATENT DOCUMENTS 6,289,278 B1 * 9/2001 Endo .................. B60K 31/0008
340/988
7,797,103 B2   9/2010 Ishigami et al.
(Continued)

FOREIGN PATENT DOCUMENTS

CN   101261316 A   9/2008
CN   101609140 A   12/2009
(Continued)

*Primary Examiner* — Jerrah Edwards
(74) *Attorney, Agent, or Firm* — Birch, Stewart, Kolasch & Birch, LLP

(57) ABSTRACT

An object of the present invention is to provide a positioning device which can more reliably and frequently correct a own vehicle position earlier, reliably detect an error matching state or a straying state earlier and correct the position to a correct position. The positioning device according to the present invention includes a GPS receiver, a GPS position calculating unit which calculates pseudo distances to the GPS satellites based on the transmission signals, and calculates a re-calculated GPS position which is the own vehicle position based on the pseudo distances, and a multipath influence evaluating unit which evaluates a multipath influence on the GPS position based on a difference between the GPS position calculated by the GPS receiver and the re-calculated GPS position calculated by the GPS position calculating unit.

9 Claims, 16 Drawing Sheets

(51) Int. Cl.
*G01C 21/28* (2006.01)
*G01S 19/22* (2010.01)
*G01S 19/42* (2010.01)

(56) References Cited

U.S. PATENT DOCUMENTS

| | | |
|---|---|---|
| 7,987,047 B2 * | 7/2011 | Ishigami ............ G01C 21/165 701/478.5 |
| 8,423,289 B2 | 4/2013 | Kagawa et al. |
| 8,793,090 B2 | 7/2014 | Oohashi et al. |
| 8,843,340 B2 | 9/2014 | Oohashi et al. |
| 2002/0093452 A1 | 7/2002 | Hirata et al. |
| 2005/0107946 A1 | 5/2005 | Shimizu et al. |
| 2009/0319174 A1 | 12/2009 | Ishigami et al. |
| 2011/0054790 A1 | 3/2011 | Kagawa et al. |
| 2011/0071755 A1 * | 3/2011 | Ishigami ............ G01C 21/165 701/478.5 |
| 2011/0170576 A1 | 7/2011 | Nagano et al. |
| 2011/0320122 A1 | 12/2011 | Oohashi et al. |

FOREIGN PATENT DOCUMENTS

| | | |
|---|---|---|
| CN | 101750066 A | 6/2010 |
| CN | 101809409 A | 8/2010 |
| CN | 102016624 A | 4/2011 |
| JP | 11-223670 A | 8/1999 |
| JP | 2001-124840 A | 5/2001 |
| JP | 2001-311768 A | 11/2001 |
| JP | 2001311768 A * | 11/2001 |
| JP | 2005-077318 A | 3/2005 |
| JP | 3745165 B2 | 2/2006 |
| JP | 3984112 B2 | 10/2007 |
| JP | 4370565 B2 | 11/2009 |
| JP | 2010-151725 A | 7/2010 |
| JP | 2010-164496 A | 7/2010 |
| JP | 4776570 B2 | 9/2011 |
| JP | 4795206 B2 | 10/2011 |
| JP | 2012-007939 A | 1/2012 |
| WO | WO 2009/034671 A1 | 3/2009 |

\* cited by examiner

F I G . 3
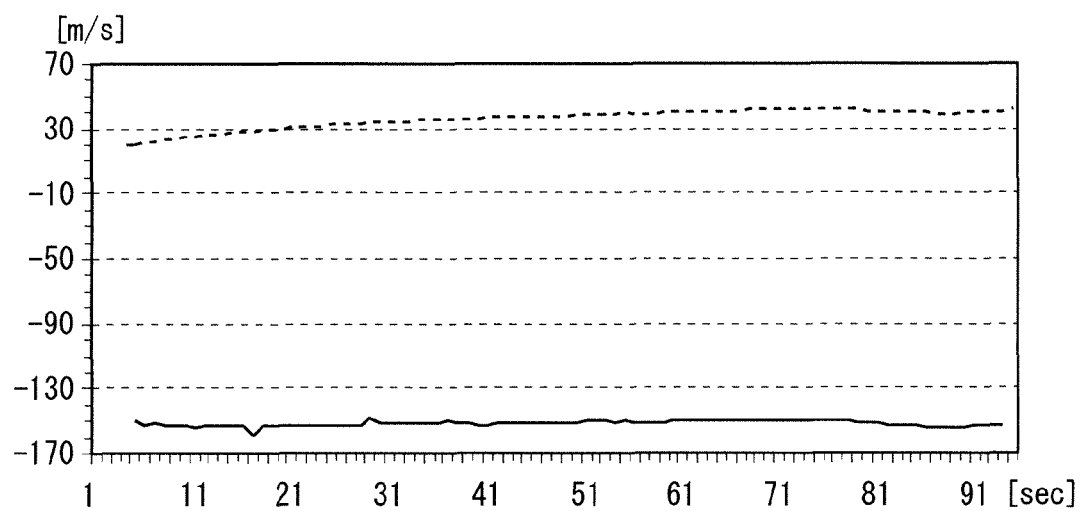
F I G . 4
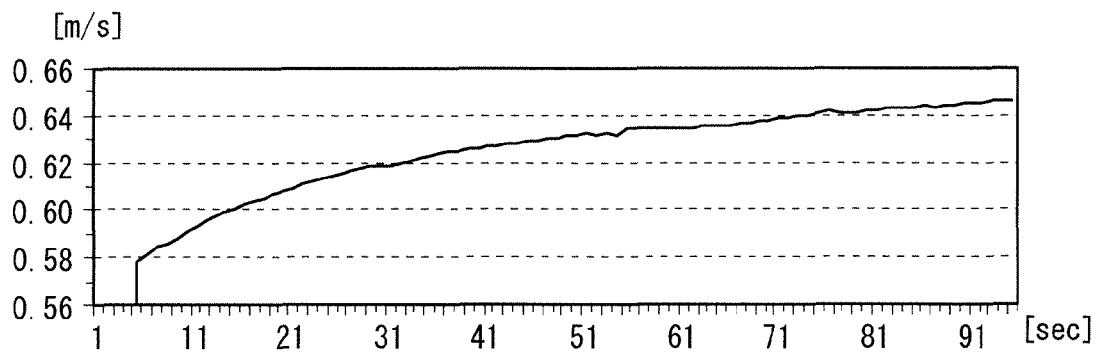

F I G . 1 5
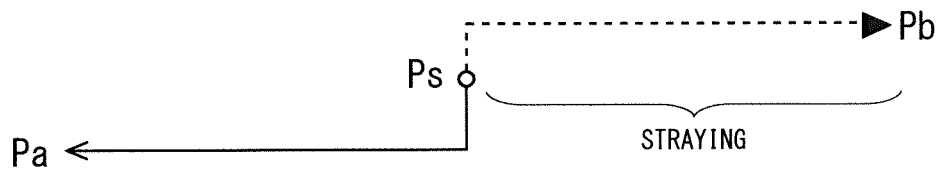
F I G . 1 6
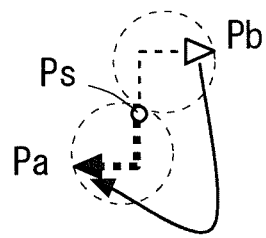
F I G . 1 7
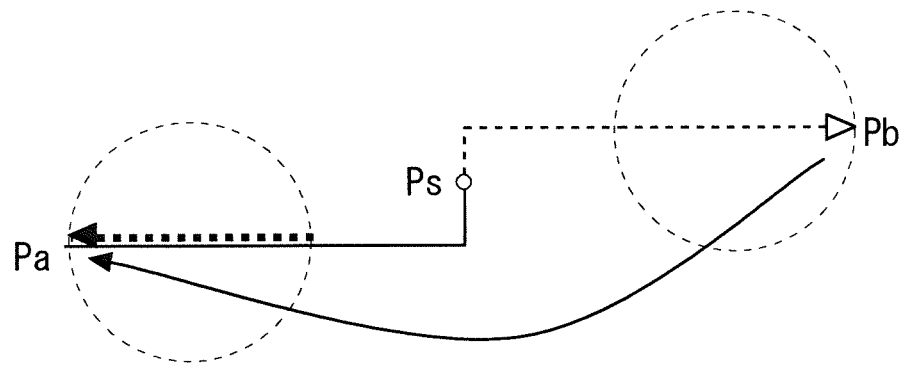

F I G . 1 9
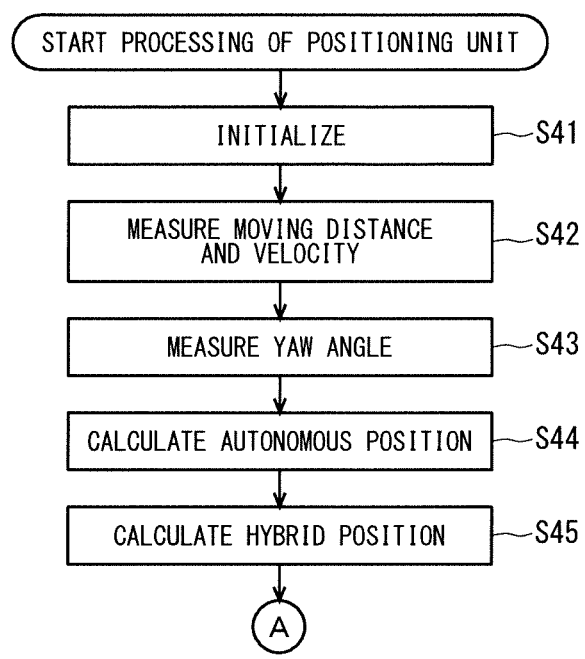

POSITIONING DEVICE

TECHNICAL FIELD

The present invention relates to a positioning device of a moving body and, more particularly, relates to a positioning device which uses transmission signals from GPS (Global Positioning System) satellites.

BACKGROUND ART

Currently, navigation devices of moving bodies such as cars are known. This navigation device displays a vehicle position on a map, and gives a guidance to a destination. When a vehicle position is displayed on a road on a map, a GPS positioning device which obtains GPS satellite positioning results and various sensors such as a velocity sensor, an angular velocity sensor and an acceleration sensor are used to observed and measure a vehicle motion and then processing called map matching is performed to identify the vehicle position on a road link of map data.

However, a moving distance, a yaw angle or a pitch angle of the vehicle measured by the sensors have a measurement error. Therefore errors (measurement errors) gradually accumulate according to autonomous navigation which adds moving vectors indicated by the sensors. An error accumulated in this way is optionally corrected using a GPS position (a vehicle position calculated by the GPS receiver) and a GPS azimuth (a vehicle azimuth calculated by the GPS receiver) observed by the GPS receiver provided independently from the sensors.

Hereinafter, a GPS positioning principle will be described. According to GPS positioning, a vehicle position (unknown value) is three-dimensionally calculated using positions (known values) of three or more GPS satellites and distances (known values) between these GPS satellites and the vehicle based on a principle of triangulation. Each GPS satellite and a vehicle make independent motions, and therefore times need to be synchronized with a common time sequence (also referred to as a GPS Time below). Hence, four unknown values including vehicle positions (x, y, z) and a built-in clock error are calculated using four or more GPS satellites of the three GPS satellites plus one GPS satellite. By synchronizing the times, it is possible to calculate distances (pseudo distances [m]) between the GPS satellites and the vehicle based on radio wave propagation times which pass until radio waves transmitted from the GPS satellites are received by the vehicle.

Further, carrier frequencies of the radio waves transmitted from the GPS satellites Doppler-shift based on relative motions between the GPS satellites and the vehicle. Therefore, the vehicle velocities ($v_{gx}$, $v_{gy}$, $v_{gz}$) are three-dimensionally calculated based on the shift amount of the Doppler-shifted frequency ([Hz]), and a vehicle azimuth is calculated based on the calculated vehicle velocities. A range rate ([m/s]) converted from the shift amount of the Doppler-shifted frequency indicates a time change amount of pseudo distances (delta range ([m/s])). However, it is necessary to estimate a range rate in case that the vehicle is assumed to be stopping to calculate a vehicle velocity.

To correct the vehicle position and azimuth using the GPS position and the GPS azimuth, it is necessary to taken into account the following problems related to GPS positioning.

(1) There is a problem that, when radio waves of GPS satellites above the vehicle (own vehicle) are shielded by architectures around the vehicle and radio waves of only three GPS satellites can be received, only three unknown values can be calculated, and therefore when the number of GPS satellites from which radio waves can be received is less than three, the vehicle position and velocity cannot be observed.

(2) When radio waves transmitted from GPS satellites and reflected by architectures around a vehicle are received, errors (multipaths) are produced in radio wave propagation times (or pseudo distances), and therefore GPS positioning accuracy lowers. More specifically, when a multipath is occurred, a trajectory shape of a GPS satellite is distorted, or even when a trajectory shape is good, a vehicle position deviation or azimuth deviation temporarily occurs.

(3) Lower speed driving which decreases a difference between a measurement value of a range rate due to a Doppler shift and an estimated value of a range rate in case that a vehicle is assumed to be stopping makes larger a rate of an error included in a GPS velocity (vehicle velocity calculated by the GPS receiver). When the GPS velocity error is greater, a GPS azimuth error calculated by the GPS velocity is also greater.

(4) Clocks in both of GPS satellites and a vehicle drift (change at an order of ns), and therefore it is necessary to correct the respective clocks. Expensive atomic clocks of little drifts are used for clocks to be mounted on GPS satellites, and error compensation parameters of the atomic clocks are broadcast (transmitted) from the GPS satellites. Therefore, the vehicle can correct the errors of clocks mounted on the GPS satellites by receiving radio waves transmitted from the GPS satellites. Meanwhile, a crystal clock of a significant drift is used for a clock mounted on a vehicle (also referred to as a built-in clock), and there is no error compensation parameter. Hence, an error of a built-in clock (also referred to as a built-in clock error) is calculated and corrected upon calculation of GPS position. However, even after correction, an error equal to or less than 1 μsec is left in the built-in clock. Such a built-in clock error becomes a measurement error of a range rate common to all reception satellites.

(5) Indexes accurately indicating positioning errors (a position error, a velocity error and an azimuth error) are not outputted from a GPS receiver.

A conventional navigation device devises a method of evaluating GPS positioning accuracy and correcting a vehicle position (own vehicle position) to increase precision of the own vehicle position (see Patent Documents 1 and 2).

According to, for example, Patent Document 1, an autonomous position (a vehicle position calculated by sensors) is corrected on a road link per predetermined time or predetermined distance. When map matching cannot be performed by autonomous navigation, an autonomous position is optionally corrected based on a good GPS positioning result. More specifically, last trajectories (positions and azimuths) of a GPS position and an autonomous position in a predetermined zone are stored per predetermined time or predetermined distance. Reliability of GPS is accredited based on a difference between total sums of moving vectors of the respective positions which configure the respective trajectories. Then, a threshold (GPS error circle) for correcting an autonomous position based on the GPS position is set. When the GPS trajectory and an autonomous trajectory substantially match, a difference between positions configuring respective trajectories is little. When a GPS positioning state is poor, the GPS trajectory and the autonomous trajectory differ, and the difference between positions configuring the respective trajectories is great. Reliability of a GPS positioning result is determined based on these characteristics. When the reliability is low, a high threshold is set, and, when a difference between a GPS position and an autonomous position is greater than the threshold, the autonomous position is corrected based on the GPS position. In addition, the above predetermined zone may be last 200 m or may be last 10 seconds to 15 seconds.

Further, an object of Patent Document 2 is to increase accuracy of an autonomous position. An autonomous trajectory is corrected such that a difference between a trajectory of higher reliability among a GPS trajectory (a vehicle trajectory calculated based on information received from GPS satellites) and a matching trajectory (a vehicle trajectory calculated by map matching processing), and an autonomous trajectory (a vehicle trajectory calculated by autonomous navigation) decreases. As to a trajectory based on which an autonomous position is corrected, the GPS trajectory is selected when the GPS trajectory is highly reliable and accurate, and a matching trajectory is selected when the GPS trajectory has reliability equal to or less than a predetermined value. The reliability of the GPS trajectory is created based on a result of comparison between the autonomous trajectory and the GPS trajectory. According to map matching, when an own vehicle position is identified on a road link on which an autonomous trajectory and a road link shape match, matching reliability is created by comparing the matching trajectory and the autonomous trajectory. The less a road width of a road link on which the own vehicle position is identified is narrower and fluctuation of a vehicle azimuth is, the higher reliability of a matching trajectory is. In addition, an autonomous azimuth is also corrected by the same method as the method of correcting the autonomous position.

PRIOR ART DOCUMENT

Patent Document

Patent Document 1: Japanese Patent No. 3984112
Patent Document 2: Japanese Patent Application Laid-Open No. 2012-7939

SUMMARY OF INVENTION

Problems to be Solved by the Invention

The navigation device performs map matching processing using a moving vector of a vehicle (own vehicle) measured per predetermined cycle, and updates a display position on a road link. Further, when the moving vector of the vehicle and the road link shape match, even in a state (error matching state) where a display position of the vehicle is not displayed on the correct road link by map matching processing, a straying state of an indication continues while the error matching state is not noticed. Hence, a task is that the navigation device discovers the error matching state earlier and returns a position to a correct position from the error matching state earlier. This task conventionally has the following problems.

(1) When a vehicle behavior in a road width differs from that in a road link (e.g. lane change, passing of a vehicle ahead, street parking, U-turn, a coordinate error of a road link and a shape error of a road link), if an autonomous position is corrected, the autonomous position is likely to be erroneously corrected.

(2) When a right or left turn is made after an increase of a distance error upon straight driving, the autonomous position erroneously matches with a parallel road, and is likely to be erroneously corrected.

(3) Even when a trajectory of a display position and an autonomous trajectory match at a place at which roads with long straight zones are parallel (or overlapped) in a narrow range, a road link with which the display position is identified is not necessarily correct. At, for example, a place at which there is another road right below an elevated road, a navigation device displays the elevated road and another road in parallel for ease of convenience. In such a case, one road link with which the display position is identified is not necessarily correct and the other road link is correct in some cases. Therefore, correcting the autonomous position is likely to lead to erroneous correction.

Further, as described above, GPS positioning has some problems. Hence, correcting an autonomous position by GPS positioning has the following problems.

(4) When a GPS trajectory shape before and after map matching fails (in, for example, a zone of last 200 m in Patent Document 1) does not match with an autonomous trajectory due to a multipath influence, an autonomous position cannot be corrected, and a straying state continues. Further, roads with good GPS trajectory shapes are limited among streets lined with buildings.

(5) When a length to compare trajectories is made longer to more accurately determine reliability of a GPS trajectory, a chance that a highly reliable GPS trajectory can be extracted under multipath environment decreases, and a chance to correct an autonomous position under multipath environment decreases.

(6) When a temperature drift of a gyro is insufficiently corrected and an autonomous azimuth error is significant, an autonomous trajectory shape is distorted and reliability based on the autonomous trajectory shape lowers.

(7) When a GPS receiver which suppresses an unnecessary fluctuation of a GPS position under multipath environment and outputs a stable GPS azimuth is used, if a car drives straightforward under multipath environment, a GPS trajectory shape indicates a driving straight state while the GPS position and the GPS azimuth are deviated. This is because GPS positioning such as autonomous positioning is performed based on a GPS velocity (a vehicle velocity calculated by a GPS receiver) and a GPS azimuth (a vehicle azimuth calculated by the GPS receiver) measured using a Doppler shift which is not directly influenced by a multipath influence. In such a case, even when a GPS trajectory and an autonomous trajectory match, the GPS position is not necessarily correct, and correcting the autonomous position leads to erroneous correction.

Further, the following problems occur when an autonomous position is erroneously corrected by map matching or a GPS position. Therefore, an effective solution to correct an autonomous position is demanded.

(8) Continuing map matching becomes difficult.

(9) A display position is erroneously corrected to a front or a back on a road link, and therefore continuing subsequent map matching becomes difficult.

(10) A display position moves to another candidate position (e.g. on a wrong road link) and performs erroneous matching, and therefore an autonomous position is further erroneously corrected.

(11) When a vehicle is driving in a place at which there is a road going into a parking lot along the road near the vehicle, it is erroneously determined that the vehicle is driving outside the road (the road going into the parking lot) even though the vehicle is driving on the road, and continuing subsequent matching becomes difficult.

(12) Contrary to above (11), it is erroneously determined that the vehicle is driving on a road even though the vehicle is driving outside the road, and an autonomous position is erroneously corrected.

The present invention has been made to solve the above problems. An object of the present invention is to provide a positioning device which can more reliably and frequently correct a own vehicle position earlier, reliably detect an error matching state or a straying state earlier and correct the position to a correct position.

Means for Solving the Problems

To solve the above problems, the positioning device according to the present invention includes: a first moving body position calculating unit that receives transmission signals transmitted from a plurality of GPS satellites, obtains pseudo distances to the UPS satellites and a Doppler shift based on the transmission signals, and calculates a first moving body position that is a position of a moving body, based on the obtained pseudo distances and the obtained Doppler shift; a second moving body position calculating unit that calculates a second moving body position that is the position of the moving body, based on the pseudo distances; and a multipath influence evaluating unit that evaluates an influence of a multipath on the first moving body position based on a difference between the first moving body position calculated by the first moving body position calculating unit and the second moving body position calculated by the second moving body position calculating unit.

Effects of the Invention

The present invention includes: a first moving body calculating unit that receives transmission signals transmitted from a plurality of GPS satellites, obtains pseudo distances to the UPS satellites and a Doppler shift based on the transmission signals, and calculates a first moving body position that is a position of a moving body, based on the obtained pseudo distances and the obtained Doppler shift; a second moving body position calculating unit that calculates a second moving body position that is the position of the moving body, based on the pseudo distances; and a multipath influence evaluating unit that evaluates an influence of a multipath on the first moving body position based on a difference between the first moving body position calculated by the first moving body position calculating unit and the second moving body position calculated by the second moving body position calculating unit. Consequently, it is possible to more reliably and frequently correct an own vehicle position earlier, reliably detect an error matching state or a straying state earlier and correct the position to a correct position.

An object, features, aspects and advantages of the present invention will be made more obvious by the following detailed description and the accompanying drawings.

BRIEF DESCRIPTION OF DRAWINGS

FIG. 3 is a view showing a delta range and a calculated range rate.

FIG. 4 is a view showing a built-in clock error.

FIG. 15 is a view for explaining correction of an autonomous position and an autonomous azimuth.

FIG. 16 is a view for explaining correction of an autonomous position and an autonomous azimuth.

FIG. 17 is a view for explaining correction of an autonomous position and an autonomous azimuth.

FIG. 19 is a flowchart showing an example of an operation of the navigation device according to the third embodiment of the present invention.

DESCRIPTION OF EMBODIMENTS

Embodiments of the present invention will be described below based on the drawings.

First Embodiment

Figure 1:
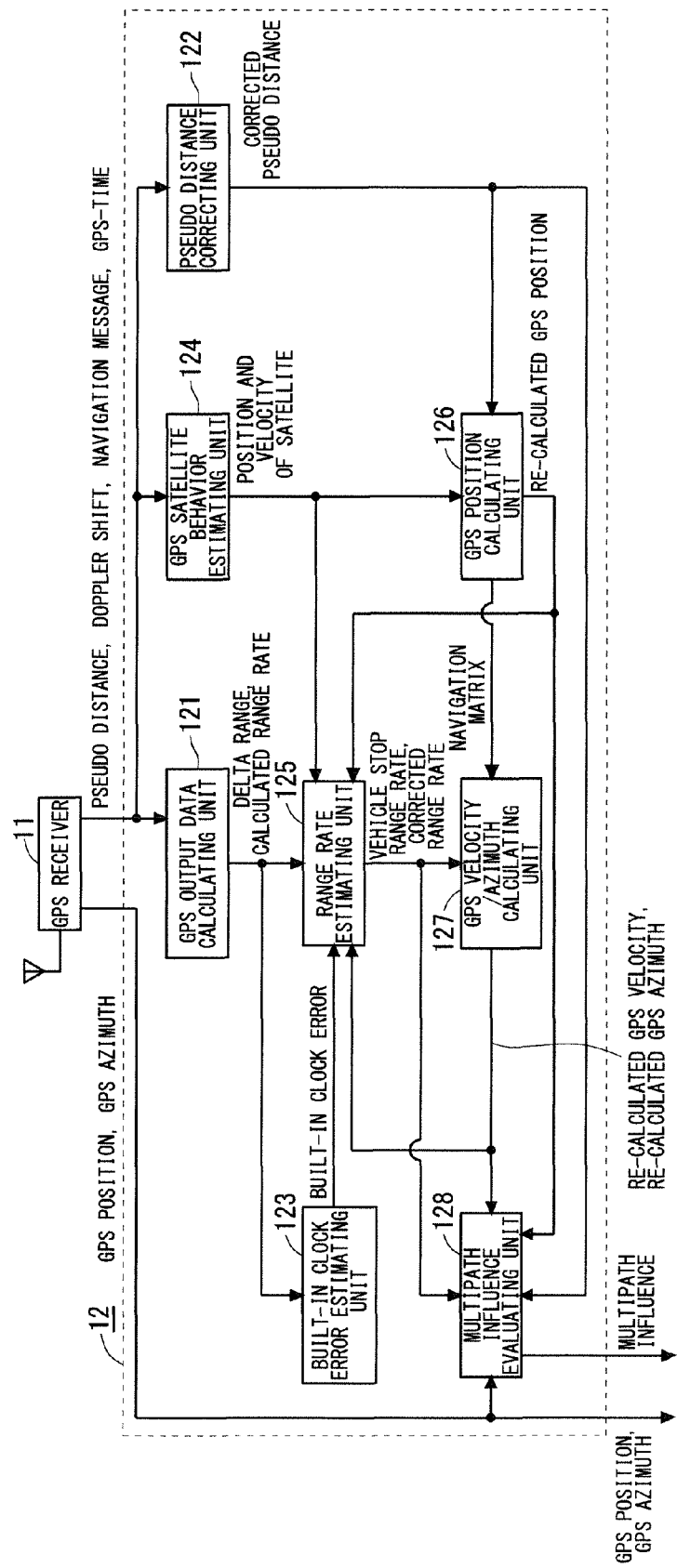
FIG. 1 is a block diagram showing an example of a configuration of a navigation device according to a first embodiment of the present invention.

A navigation device having a positioning device of a moving body such as a car will be described below. FIG. 1 is a block diagram showing an example of a configuration required to measure a position of the vehicle (also referred to as an own vehicle) in a configuration of the navigation device according to a first embodiment of the present invention.

As shown in FIG. 1, the navigation device according to the first embodiment has a GPS receiver 11 which receives transmission signals from GPS satellites (not shown), and obtains Raw data (data such as pseudo distances, Doppler shifts, navigation messages and GPS times required for positioning calculation) based on the transmission signals, and a positioning unit 12 which evaluates to what degree a GPS position and a GPS azimuth calculated by the GPS receiver 11 are influenced by a multipath based on the Raw data obtained by the GPS receiver 11. In addition, an own vehicle position, velocity and azimuth calculated based on the Raw data obtained by the GPS receiver 11 are referred to as a GPS position, a GPS velocity and a GPS azimuth below.

Next, the GPS receiver 11 and the positioning unit 12 will be described in detail.

The GPS receiver 11 (first moving body position calculating unit) has a GPS antenna which receives transmission signals (radio waves) transmitted from a plurality of GPS satellites above the own vehicle. The GPS receiver 11 obtains Raw data (a pseudo distance, a Doppler shift, a navigation message and a GPS-time) based on the transmission signal from each GPS satellite received at the GPS antenna, calculates the GPS position (first moving body position), the GPS velocity and the GPS azimuth direction (first moving body azimuth), and outputs the calculated positioning result and the Raw data to the positioning unit 12.

The positioning unit 12 has a GPS output data calculating unit 121 (calculating unit), a pseudo distance correcting unit 122, a built-in clock error estimating unit 123, a GPS satellite behavior estimating unit 124, a range rate estimating unit 125, a GPS position calculating unit 126 (second moving body position calculating unit), a GPS velocity/azimuth calculating unit 127 and a multipath influence evaluating unit 128.

Although described in detail below, the GPS output data calculating unit 121 (calculating unit) calculates a time difference value of the pseudo distances as a delta range $\Delta\rho_{C\tau}(t_i)$ based on the pseudo distances $\rho_{C\tau}(t_i)$ from the GPS receiver 11 (substantially, the transmission signals from the GPS satellites). In addition, $t_i$ indicates a time of positioning processing of the positioning unit 12 repeated at a processing cycle $\Delta T$, and a subscript i indicates a number which increases by one per processing cycle $\Delta T$.

Further, the GPS output data calculating unit 121 calculates the delta range, and calculates a range rate $\Delta\rho_{rate}(t_i)$ (first range rate) having the same unit ([m/s]) as a delta range $\Delta\rho_{C\tau}(t_i)$ based on a Doppler shift $f_{dop}(t_i)$ (substantially, a Doppler shift of a transmission signal from the GPS satellite) from the GPS receiver 11. The GPS output data calculating unit 121 calculates the delta range $\Delta\rho_{C\tau}(t_i)$ and the range rate $\Delta\rho_{rate}(t_i)$ of each GPS satellite (also referred to as a reception satellite below) whose transmission signal is received by the GPS receiver 11.

In addition, a plurality of types of range rates appears in the following description, and therefore the range rate $\Delta\rho_{rate}(t_i)$ calculated by the GPS output data calculating unit 121 is also referred to as a calculated range rate $\Delta\rho_{rate}(t_i)$ for ease of convenience.

The pseudo distance correcting unit 122 calculates a satellite mounted clock error $dT_{sat}$, an ionospheric radio wave propagation delay error $d_{iono}$, and a tropospheric radio wave propagation delay error $d_{trop}$ included in the pseudo distance $\rho_{C\tau}(t_i)$ outputted from the GPS receiver 11 using the navigation message outputted from the GPS receiver 11, and calculates a pseudo distance (also referred to as a corrected pseudo distance $\rho_{C\tau}'(t_i)$ below) corrected to exclude these errors.

The built-in clock error estimating unit 123 receives an input of the delta ranges $\Delta\rho_{C\tau}(t_i)$ and the calculated range rates $\Delta\rho_{rate}(t_i)$ of all reception satellites calculated by the GPS output data calculating unit 121. The built-in clock error estimating unit 123 estimates an error of a built-in clock provided in the car as a built-in clock error $\epsilon_{tcar}(t_i)$ based on the a difference (subtraction in this case) between the delta range $\Delta\rho_{C\tau}(t_i)$ and the calculated range rate $\Delta\rho_{rate}(t_i)$.

In addition, the built-in clock error estimating unit 123 can estimate one built-in clock error $\epsilon_{tcar}(t_i)$ from the delta range $\Delta\rho_{C\tau}(t_i)$ and the calculated range rate $\Delta\rho_{rate}(t_i)$ of one reception satellite. However, if the built-in clock error estimating unit 123 receives an input of the delta ranges $\Delta\rho_{C\tau}(t_i)$ and the calculated range rates $\Delta\rho_{rate}(t_i)$ of a plurality of reception satellites, the built-in clock error estimating unit 123 estimates an average value of a plurality of built-in clock errors $\epsilon t_{car}(t_i)$ estimated from these delta ranges and the calculated range rates as one built-in clock error $\epsilon t_{car}(t_i)$.

The GPS satellite behavior estimating unit 124 estimates a position $P_s$ and a velocity $V_s$ of a GPS satellite in a GPS-Time based on the navigation message outputted from the GPS receiver 11. The GPS satellite behavior estimating unit 124 estimates this positions $P_s$ and the velocities $V_s$ of all reception satellites per processing cycle of the positioning unit 12.

The range rate estimating unit 125 receives an input of the calculated range rates $\Delta\rho_{rate}(t_i)$ from the GPS output data calculating unit 121, the built-in clock errors $\epsilon t_{car}(t_i)$ from the built-in clock error estimating unit 123, the positions $P_s$ and the velocities $V_s$ of all reception satellites from the GPS satellite behavior estimating unit 124, and re-calculated GPS position (own vehicle position $P_o$ as the second moving body position) calculated by the GPS position calculating unit 126 described below.

The range rate estimating unit 125 estimates a range rate $\Delta\rho_{rate-s}(t_i)$ (second range rate) in case that the vehicle is assumed to be stopping, based on the positions $P_s$ and the velocities $V_s$ of all reception satellites and the re-calculated GPS position (own vehicle position $P_o$). In addition, the range rate $\Delta\rho_{rate-s}(t_i)$ estimated by the range rate estimating unit 125 in case that the vehicle is assumed to be stopping is also referred to as a vehicle stop range rate $\Delta\rho_{rate-s}(t_i)$.

Further, the range rate estimating unit 125 estimates the vehicle stop range rate $\Delta\rho_{rate-s}(t_i)$, and corrects the calculated range rate $\Delta\rho_{rate}(t_i)$ calculated by the GPS output data calculating unit 121 based on the built-in clock error $\epsilon_{tcar}(t_i)$ estimated by the built-in clock error estimating unit 123.

The GPS position calculating unit 126 (second moving body position calculating unit) performs numerical value calculation based on the corrected pseudo distances $\rho_{C\tau}'(t_i)$ from the pseudo distance correcting unit 122 and the positions $P_s$ and the velocities $V_s$ of all reception satellites from the GPS satellite behavior estimating unit 124 to calculate the re-calculated GPS position (own vehicle position $P_o$ as the second moving body) and outputs the re-calculated GPS position to the range rate estimating unit 125 and the multipath influence evaluating unit 128. Further, the GPS position calculating unit 126 generates a navigation matrix A including the positions $P_s$ of all reception satellites from the GPS satellite behavior estimating unit 124 and the re-calculated GPS position calculated by the GPS position calculating unit 126, and outputs the navigation matrix A to the GPS velocity/azimuth calculating unit 127. In this regard, the re-calculated GPS position refers to an own vehicle position recalculated (recalculation is used for ease of description to make a distinction from the GPS position calculated by the GPS receiver 11) by the positioning unit 12 (GPS position calculating unit 126) based on the Raw data received from the GPS receiver 11.

The GPS velocity/azimuth calculating unit 127 calculates re-calculated GPS velocities (own vehicle velocities $V_o$) of three axial directions which form an ENU coordinate system (an orthogonal coordinate system in which the east direction is defined as a x axis, the north direction is defined as a y axis, the vertical direction is defined as a z axis and the xy plane is defined as a horizontal plane), based on the navigation matrix A from the GPS position calculating unit 126, the vehicle stop range rate $\Delta\rho_{rate-s}(t_i)$ estimated by the range rate estimating unit 125 and the calculated range rate $\Delta\rho_{rate}(t_i)$ corrected by the range rate estimating unit 125. Further, the GPS velocity/azimuth calculating unit 127 calculates a re-calculated GPS azimuth (a vehicle azimuth as the second moving body azimuth) based on the re-calculated GPS velocity. In this regard, the re-calculated GPS velocity refers to a own vehicle velocity recalculated (recalculation is used for ease of description to make a distinction from the GPS velocity calculated by the GPS receiver 11) by the positioning unit 12 (GPS velocity/azimuth calculating unit 127) based on the Raw data received from the GPS receiver 11. Further, the same applies to the re-calculated GPS azimuth.

The multipath influence evaluating unit 128 evaluates a multipath influence on the GPS position and the GPS azimuth calculated by the GPS receiver 11 based on the vehicle stop range rate $\Delta\rho_{rate\text{-}s}(t_i)$ estimated by the range rate estimating unit 125, the calculated range rate $\Delta\rho_{rate}(t_i)$ corrected by the range rate estimating unit 125, the re-calculated GPS position calculated by the GPS position calculating unit 126, the re-calculated GPS velocity and the re-calculated GPS azimuth calculated by the GPS velocity/azimuth calculating unit 127, and the corrected pseudo distances $\rho_{Cr}'(t_i)$ calculated by the pseudo distance correcting unit 122.

Figure 2:
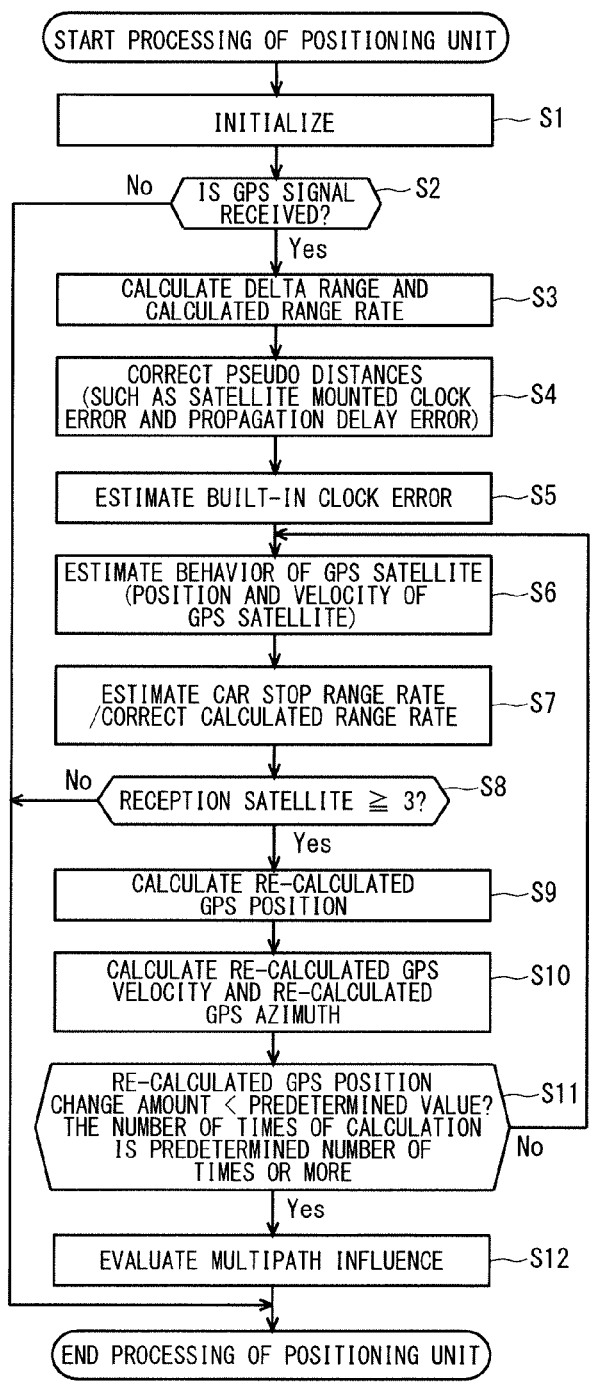
FIG. 2 is a flowchart showing an example of an operation of the navigation device according to the first embodiment of the present invention.

Next, an operation of the navigation device in FIG. 1 will be described with reference to the flowchart in FIG. 2 showing positioning processing performed by the positioning unit 12 per processing cycle.

First, in step S1, the navigation device initializes the positioning unit 12.

In step S2, the positioning unit 12 determines whether or not the number of reception satellites is one or more, i.e., whether or not transmission signals transmitted from one or more GPS satellites are received. When it is determined that the transmission signals are received, the step moves to step S3, and, when it is determined that no transmission signal is received, current positioning processing is finished without performing any processing.

In step S3, the GPS output data calculating unit 121 calculates a time difference value between the pseudo distance of previous positioning processing and the pseudo distance of current positioning processing as a delta range $\Delta\rho_{Cr}(t_i)$ by applying to following equation (1) the pseudo distance $\rho_{Cr}(t_{i-1})$ of previous positioning processing and the pseudo distance $\rho_{Cr}(t_i)$ of the current positioning processing outputted from the GPS receiver 11.

[Mathematical 1]

$$\Delta\rho_{Cr}(t_i)=(\rho_{Cr}(t_i)-\rho_{Cr}(t_{i-1}))/\Delta t \quad (1)$$

Where, $\Delta\rho_{Cr}(t_i)$: Delta range [m/s]
$\rho_{Cr}(t_i)$: Pseudo distance outputted from GPS receiver in current positioning processing [m]
$\rho_{Cr}(t_{i-1})$: Pseudo distance outputted from GPS receiver in previous positioning processing [m]
$\Delta t$: Processing cycle [s]

Further, in same step S3, the GPS output data calculating unit 121 calculates the calculated range rate $\Delta\rho_{rate}(t_i)$ by applying to following equation (2) the Doppler shift $f_{dop}(t_i)$ outputted from the GPS receiver 11.

[Mathematical 2]

$$\Delta\rho_{rate}(t_i)=f_{dop}(t_i)\cdot C/f_{L1} \quad (2)$$

Where, $\Delta\rho_{rate}(t_i)$: Calculated rage range [m/s]
$f_{L1}$: Carrier frequency of satellite radio wave [Hz]
C: Velocity of light [m/s]

In step S4, the pseudo distance correcting unit 122 calculates the satellite mounted clock error $dT_{sat}$ and the ionospheric radio wave propagation delay error $d_{iono}$ included in the pseudo distance $\rho_{Cr}(t_i)$ based on the navigation message outputted from the GPS receiver 11, and calculates the tropospheric radio wave propagation delay error $d_{trop}$ included in the pseudo distance $\rho_{Cr}(t_i)$ based on an error model. Further, the pseudo distance correcting unit 122 calculates a corrected pseudo distance $\rho_{Cr}'(t_i)$ by correcting the pseudo distance $\rho_{Cr}(t_i)$ by applying to following equation (3) the pseudo distance $\rho_{Cr}(t_i)$ and these errors.

[Mathematical 3]

$$\rho_{Cr}'(t_i)=\rho_{Cr}(t_i)+dT_{sat}-d_{iono}-d_{trop} \quad (3)$$

Where, $\rho_{Cr}(t_i)$: Corrected pseudo distance [m]
$dT_{sat}$: Satellite mounted clock error [m]
$d_{iono}$: Ionospheric radio wave propagation delay error [m]
$d_{trop}$: Tropospheric radio wave propagation delay error [m]

In step S5, the built-in clock error estimating unit 123 applies the delta ranges $\Delta\rho_{Cr}(t_i)$ and the calculated range rates $\Delta\rho_{rate}(t_i)$ all reception satellites obtained in step S3, to following equation (4) including these deltas, and estimates a built-in clock errors $\epsilon_{tcar}(t_i)$. When the number of all reception satellites is plural, i.e., a plurality of built-in clock errors $\epsilon_{tcar}(t_i)$ can be obtained, the average of the built-in clock errors is one built-in clock error $\epsilon_{tcar}(t_i)$.

[Mathematical 4]

$$\epsilon_{tcar}(t_i)=(\Delta\rho_{rate}(t_i)-\Delta\rho_{Cr}(t_i))\cdot\Delta t/C \quad (4)$$

Where, $\epsilon_{tcar}(t_i)$: Built-in clock error [s]
$\Delta\rho_{rate}(t_i)$: Calculated range rate [m/s]
$\Delta\rho_{Cr}(t_i)$: Delta range [m/s]
$\Delta t$: Processing cycle [s]
C: Velocity of light [m/s]

FIG. 3 is a view showing an actual calculation result of the delta range $\Delta\rho_{Cr}(t_i)$ and the calculated range rate $\Delta\rho_{rate}(t_i)$. FIG. 3 shows the delta range $\Delta\rho_{Cr}(t_i)$ as a solid line and the calculated range rate $\Delta\rho_{rate}(t_i)$ as a broken line.

FIG. 4 shows a view showing the built-in clock error $\epsilon_{tcar}(t_i)$ obtained by applying the calculation result shown in FIG. 3 to equation (4). As shown in FIG. 4, the built-in clock error $\epsilon_{tcar}(t_i)$, i.e., a drift of the built-in clock cannot be expressed in a linear format, and therefore the frequency to estimate the built-in clock error $\epsilon_{tcar}(t_i)$ is preferably high.

Back to FIG. 2, after step S5, the positioning unit 12 performs convergence calculation on the re-calculated GPS position (own vehicle position $P_o$) based on the Raw data (i.e., the transmission signals from the GPS satellites) by performing loop processing in following step S6 to step S11 in one positioning processing. When, for example, a difference between the re-calculated GPS position obtained by previous loop processing and a re-calculated GPS position obtained by current loop processing is a predetermined value or less, the positioning unit 12 finishes the loop processing. The re-calculated GPS position obtained in this case is used as a re-calculated GPS position (own vehicle position) obtained by current positioning processing, and is used for evaluation performed by the multipath influence evaluating unit 128.

Next, an operation of each step from step S6 to step S11 will be described in detail.

In step S6, the GPS satellite behavior estimating unit 124 estimates the positions $P_s$ ($x_s$, $y_s$, $z_s$) and the velocities $V_s$ ($V_{sx}$, $V_{sy}$, $V_{sz}$) of all reception satellites in the GPS-Time using an ephemeris included in the navigation message from the GPS receiver 11. After the GPS-Time is initialized by the GPS-Time from the GPS receiver 11, a value of the GPS-Time changes during convergence calculation, and, following this change, the positions $P_s$ and the velocities $V_s$ of the GPS satellites on a satellite trajectory also change.

In step S7, the range rate estimating unit 125 estimates the vehicle stop range rate $\Delta\rho_{rate-s}(t_i)$ by applying to following equation (5) the positions $P_s$ ($x_s$, $y_s$, $z_s$) and the velocities $V_s$ ($V_{sx}$, $V_{sy}$, $V_{sz}$) of all reception satellites estimated by the GPS satellite behavior estimating unit 124 and the own vehicle positions $P_o$ ($x_o$, $y_o$, $z_o$) which are the re-calculated GPS positions estimated by the GPS position calculating unit 126. In addition, for the own vehicle position $P_o$, a re-calculated GPS position (own vehicle position $P_o$) calculated in step S9 in previous processing (previous loop processing or previous positioning processing) is used.

[Mathematical 5]

$$\Delta\rho_{rate-s}(t_i) = LOS_x \cdot v_{sx} + LOS_y \cdot v_{sy} + LOS_z \cdot V_{sz} \quad (5)$$

Meanwhile, $$LOS_x = (x_o - x_s) / \|P_s - P_o\|$$

$$LOS_y = (y_o - y_s) / \|P_s - P_o\|$$

$$LOS_z = (z_o - z_s) / \|P_s - P_o\|$$

$$\|P_s - P_o\| = \sqrt{(x_s - x_o)^2 + (y_s - y_o)^2 + (z_s - z_o)^2}$$

Where,
$\Delta\rho_{rate-s}(t_i)$: Vehicle stop range rate [m/s]
$P_s$: Positions ($x_s$, $y_s$, $z_s$) of GPS satellite calculated from navigation message [m]
$V_s$: Velocities ($v_{sx}$, $v_{sy}$, $v_{sz}$) of GPS satellite calculated from navigation message [m/s]
$P_o$: Own vehicle position ($x_o$, $y_o$, $z_o$) [m]
$\|P_s - P_o\|$: Distance between GPS satellite position and own vehicle position [m]
LOS: Line of site vector viewing GPS satellite from own vehicle Further, in addition to estimation of a vehicle stop range rate, the range rate estimating unit 125 applies to following equation (6) the calculated range rate $\Delta\rho_{rate}(t_i)$ calculated in step S3 by the GPS output data calculating unit 121 and the built-clock error $\epsilon_{tcar}(t_i)$ estimated in step S5 by the built-in clock error estimating unit 123. That is, the range rate estimating unit 125 corrects the calculated range rate $\Delta\rho_{rate}(t_i)$ based on the built-in clock error $\epsilon_{tcar}(t_i)$. In addition, the range rate corrected by the range rate estimating unit 125 is also referred to as the corrected range rate $\Delta\rho_{rate}'(t_i)$ below.

[Mathematical 6]

$$\Delta\rho_{rate}'(t_i) = \Delta\rho_{rate}(t_i) - \epsilon_{tcar}(t_i) / \Delta t \cdot C \quad (6)$$

Where,
$\Delta\rho_{rate}'(t_i)$: Corrected range rate [m/s]
$\Delta\rho_{rate}(t_i)$: Calculated range rate [m/s]
$\epsilon_{tcar}(t_i)$: Built-in clock error [s]
$\Delta t$: Processing cycle [s]
C: Velocity of light [m/s]

Figure 5:
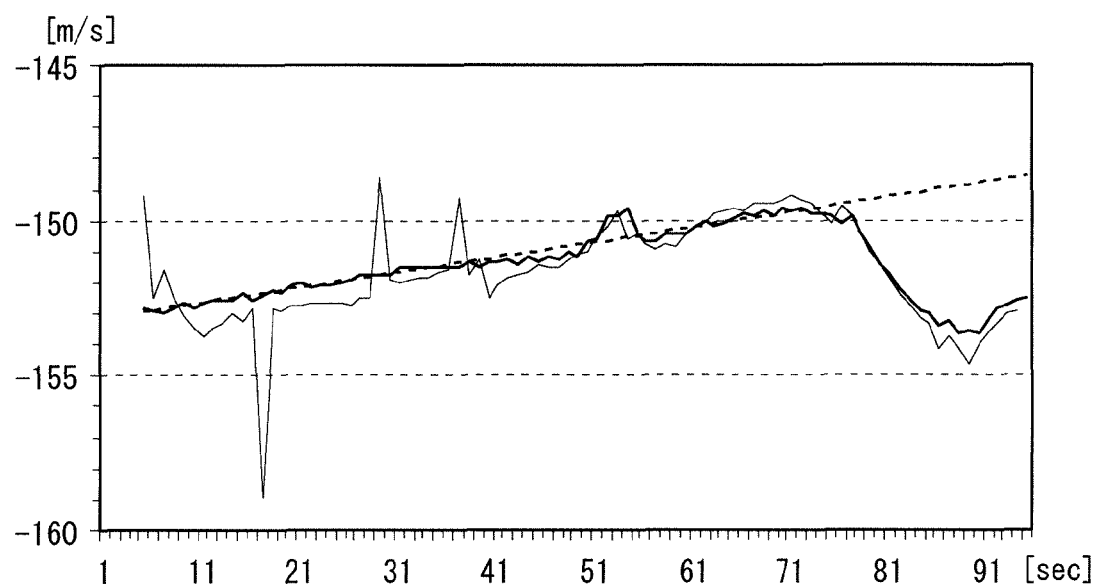
FIG. 5 is a vehicle stop range rate, a corrected range rate and a delta range.

In this regard, to make it easier to understand a relationship among the vehicle stop range rate $\Delta\rho_{rate-s}(t_i)$ obtained from equation (5), the corrected range rate $\Delta\rho_{rate}'(t_i)$ obtained from equation (6) and the delta range $\Delta\rho_{Cr}(t_i)$ obtained from equation (1), FIG. 5 shows time transitions of the vehicle stop range rate, the corrected range rate and the delta range obtained from the data shown in FIG. 3. In addition, in FIG. 5, the vehicle stop range rate $\Delta\rho_{rate-s}(t_i)$ indicated by a broken line, the corrected range rate $\Delta\rho_{rate}'(t_i)$ is indicated by a bold solid line and the delta range $\Delta\rho_{Cr}(t_i)$ is indicated by a thin solid line.

Figure 6:
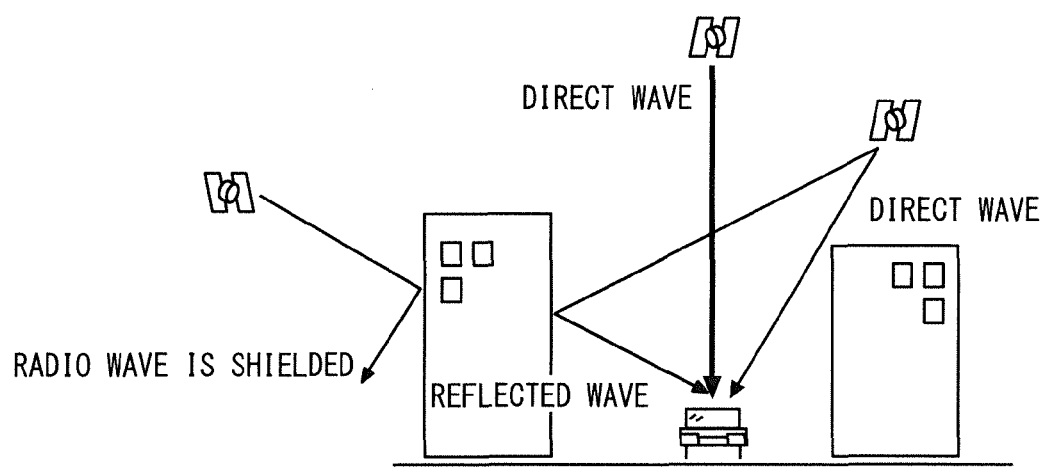
FIG. 6 is a view showing multipaths.

FIG. 6 is a view showing multipaths including paths of a GPS satellite radio wave (reflected wave) reflected by an architecture or the like, and a GPS satellite radio wave (direct wave) which is not reflected. An abrupt change appearing in the delta range $\Delta\rho_{Cr}(t_i)$ indicated by the thin solid line in FIG. 5 indicates a multipath influence. In addition, FIG. 5 shows a data result obtained when the vehicle drives out of a parking lot around which there are a small number of buildings. Even in this case, a little multipath influence temporarily is produced in the delta range $\Delta\rho_{Cr}(t_i)$.

Meanwhile, as shown in FIG. 5, the corrected range rate $\Delta\rho_{rate}'(t_i)$ obtained by above equation (6) includes the suppressed multipath influence (abrupt change) unlike the delta range $\Delta\rho_{Cr}(t_i)$, and substantially matches with the delta range $\Delta\rho_{Cr}(t_i)$ except the influence. Further, this corrected range rate $\Delta\rho_{rate}'(t_i)$ substantially matches with the vehicle stop range rate $\Delta\rho_{rate-s}(t_i)$ when the vehicle stops.

Figure 7:
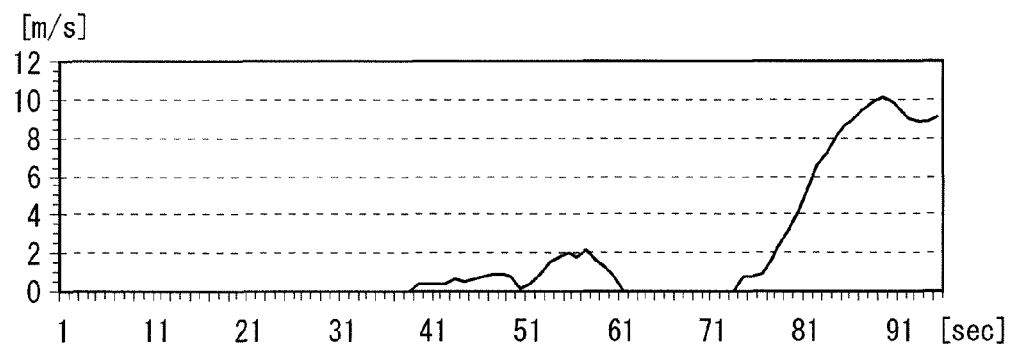
FIG. 7 is a view showing an own vehicle velocity measured by a velocity sensor.

Next, FIG. 7 shows a own vehicle velocity measured by a velocity sensor (not shown in FIG. 1) under the same situation as that in FIG. 5. It is found that a difference between the corrected range rate $\Delta\rho_{rate}'(t_i)$ and the vehicle stop range rate $\Delta\rho_{rate-s}(t_i)$ shown in FIG. 5 relates to the own vehicle velocity measured by the velocity sensor shown in FIG. 7. Thus, it is possible to calculate the own vehicle velocity by calculating the difference between the corrected range rate $\Delta\rho_{rate}'(t_i)$ and the vehicle stop range rate correcting $\Delta\rho_{rate-s}(t_i)$. Consequently, it is found that correcting the calculated range rate $\Delta\rho_{rate}(t_i)$ based on the built-in clock error $\epsilon_{tcar}(t_i)$, i.e., calculating the corrected range rate $\Delta\rho_{rate}'(t_i)$ is important.

Back to FIG. 2, in step S8, the positioning unit 12 checks whether the number of GPS satellites for which positioning calculation can be performed, i.e., the number of all reception satellites is three or more. When the number of all reception satellites is three or more, the step moves to step S9. When the number of all reception satellites is less than three, current positioning processing is finished.

In step S9, the GPS position calculating unit 126 calculates the own vehicle position $P_o$ (re-calculated GPS position) of current loop processing by applying to following equation (7) the corrected pseudo distances $\rho_{Cr}'(t_i)$ calculated in step S4, the positions $P_s$ and the velocities $V_s$ of all reception satellites estimated in step S6, and the own vehicle position $P_o$ (re-calculated GPS position) calculated in previous processing (previous loop processing or previous positioning processing) by the GPS position calculating unit 126. In this case, the GPS position calculating unit 126 generates the navigation matrix A including the positions $P_s$ of all reception satellites estimated in step S6, and the own vehicle position $P_o$ calculated by the GPS position calculating unit 126.

[Mathematical 7]

$$Po = Po + \delta Po \quad (7)$$

Meanwhile, $$\delta Po = (A^T W A)^{-1}(A^T W) \times \begin{vmatrix} \rho'_{Cr1} - R_1 \\ \rho'_{Cr2} - R_2 \\ \vdots \\ \rho'_{Crn} - R_n \end{vmatrix}$$

$$R = \sqrt{(x_s - x_o)^2 + (y_s - y_o)^2 + (z_s - z_o)^2}$$

$$W = \begin{vmatrix} 1/(\sigma_{\delta\rho 1})^2 & 0 & 0 & 0 \\ 0 & 1/(\sigma_{\delta\rho 2})^2 & 0 & 0 \\ \vdots & \vdots & \vdots & \vdots \\ 0 & 0 & 0 & 1/(\sigma_{\delta\rho n})^2 \end{vmatrix}$$

$$A = \begin{vmatrix} LOS_{1x} & LOS_{1y} & LOS_{1z} & 1 \\ LOS_{2x} & LOS_{2y} & LOS_{2z} & 1 \\ \vdots & \vdots & \vdots & \vdots \\ LOS_{nx} & LOS_{ny} & LOS_{nz} & 1 \end{vmatrix}$$

Wherein,
$P_o$: Own vehicle position $(x_0, y_0, z_0)$ [m]
$\delta P_o$: Change amount of own vehicle position $(\delta x_0, \delta y_0, \delta z_0)$ [m]
A: Navigation matrix
W: Weighted matrix
n: Number of all reception satellites
$\sigma_{\delta\rho}$: Standard deviation related to pseudo distance error [m]

In addition, a standard deviation $\sigma_{\delta\rho}$ of pseudo distance errors in equation (7) is included per reception satellite and is calculated from a history of each processing cycle. Further, description of "$(t_i)$" is omitted in equation (7) for ease of description.

In step S10, the GPS velocity/azimuth calculating unit 127 calculates the own vehicle velocities $V_o(V_{ox}, V_{oy}, V_{oz})$ related to the three axial directions which form the ENU coordinate system by applying to following equation (8) the navigation matrix A from the GPS position calculating unit 126, the vehicle stop range rate $\Delta\rho_{rate-s}(t_i)$ and the corrected range rate $\Delta\rho_{rate}'(t_i)$ estimated by the range rate estimating unit 125. The difference between the vehicle stop range rate $\Delta\rho_{rate-s}(t_i)$ and the corrected range rate $\Delta\rho_{rate}'(t_i)$ included in this equation (8) corresponds to an own vehicle velocity (re-calculated GPS velocity) as described above with reference to FIGS. 5 and 7. Further, similar to equation (7), description of "$(t_i)$" is also omitted in equation (8) for ease of description,

[Mathematical 8]

$$V_o = (A^T W A)^{-1}(A^T W) \times \begin{vmatrix} \Delta\rho'_{rate1} - \Delta\rho_{rate-s1} \\ \Delta\rho'_{rate2} - \Delta\rho_{rate-s2} \\ \vdots \\ \Delta\rho'_{raten} - \Delta\rho_{rate-sn} \end{vmatrix} \quad (8)$$

Wherein,
$V_o$: Own vehicle velocity $(v_{ox}, v_{oy}, v_{oz})$ [m/s]

In step S11, the positioning unit 12 determines whether or not the own vehicle position $P_o$ (re-calculated GPS position) converges in current positioning processing. More specifically, when a change amount $\delta P_o$ of the own vehicle position $P_o$ in above equation (7) is less than a predetermined value, it is determined that the own vehicle position $P_o$ converges, and the step moves to step S12.

Meanwhile, when the change amount $\delta P_o$ is the predetermined value or more and the number of times of calculation of the own vehicle position $P_o$ is less than a predetermined number of times, it is determined that the own vehicle position $P_o$ does not converge, the step returns to step S6 and convergence calculation is performed again. Further, the change amount $\delta P_0$ is the predetermined value or more and the number of times of calculation of the own vehicle position $P_o$ is the predetermined number of times, it is determined that the own vehicle position cannot converge and processing of the positioning unit 12 may abnormally end.

In step S12, the multipath influence evaluating unit 128 evaluates a multipath influence on the GPS position and the GPS azimuth calculated by the GPS receiver 11 based on the vehicle stop range rate $\Delta\rho_{rate-s}(t_i)$ estimated by the range rate estimating unit 125, the calculated range rate $\Delta\rho_{rate}(t_i)$ corrected by the range rate estimating unit 125, the re-calculated GPS position calculated by the GPS position calculating unit 126, the re-calculated GPS velocity and the re-calculated GPS azimuth calculated by the GPS velocity/azimuth calculating unit 127, and the corrected pseudo distances $\rho_{Cr}'(t_i)$ calculated by the pseudo distance correcting unit 122. The multipath influence evaluating unit 128 evaluates a multipath influence on a GPS position and a GPS azimuth based on four tendencies (tendencies A to D). The four tendencies A to D used by the multipath influence evaluating unit 128 will be described below in order.

First, the tendency A will be described.

Figure 8:
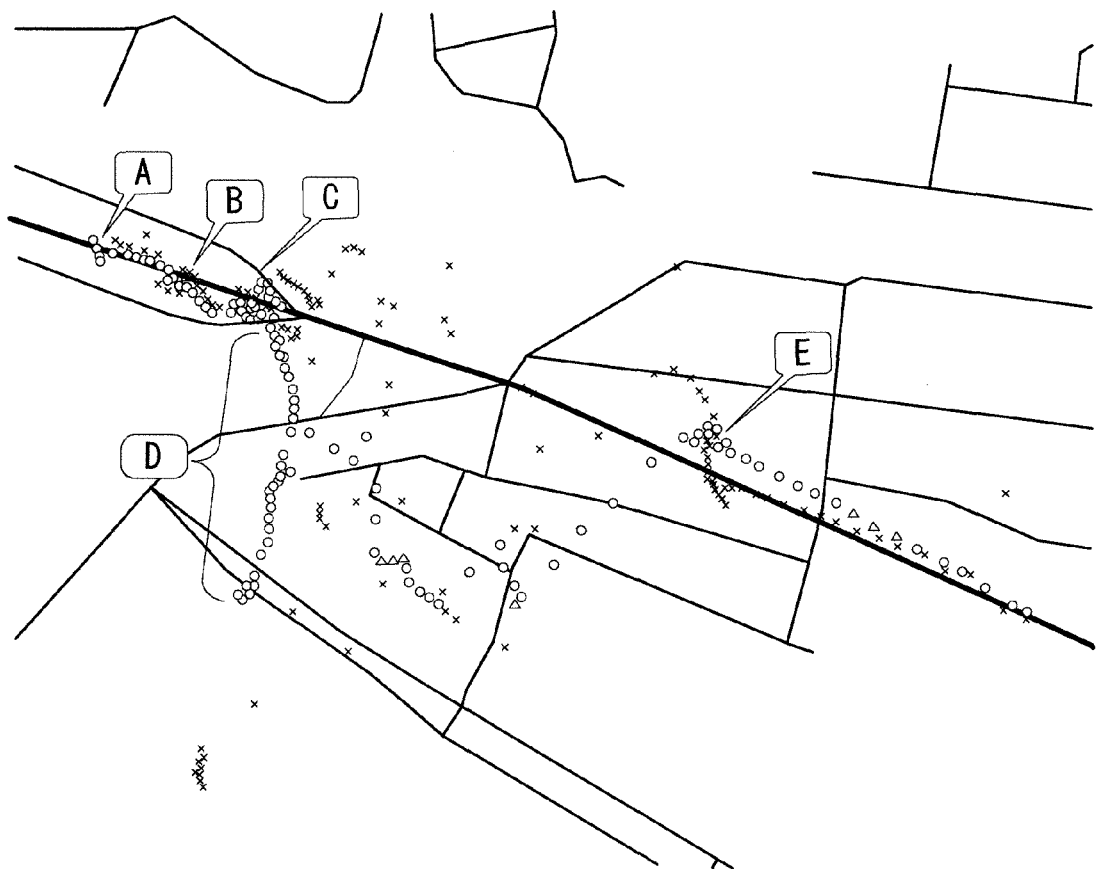
FIG. 8 is a view showing an example of an evaluation on a multipath influence.

FIG. 8 is a view showing an example where GPS positions calculated by the GPS receiver 11, and re-calculated GPS positions calculated in step S9 in FIG. 2 by the GPS position calculating unit 126 are displayed on a map. In addition, in FIG. 8, GPS positions obtained by 3D positioning are indicated as circles, GPS positions obtained by 2D positioning are indicated as triangles and the re-calculated GPS positions are indicate as crosses. Further, A to D in FIG. 8 indicate vehicle stop spots. In this regard, the 3D positioning refers to positioning using four or more satellites. Further, the 2D positioning refers to positioning using three satellites.

The GPS receiver 11 calculates GPS positions using Doppler shifts which are not directly influenced by a multipath to obtain a smooth GPS trajectory even under multipath environment. Meanwhile, the GPS position calculating unit 126 calculates re-calculated GPS positions using pseudo distances which are directly influenced by the multipath.

As shown in FIG. 8, zones of the vehicle stop spots D and E are greatly influenced by a multipath, and the other zones are influenced little by a multipath (or are not influenced). That is, GPS positions and re-calculated GPS positions tend not to match in the zones of the vehicle stop spots D and E which are greatly influenced by a multipath. GPS positions and re-calculated GPS positions tend to match in other places which are influenced little by a multipath (or which are not influenced). Thus, GPS positions and re-calculated GPS positions tend to match at places which are influenced little by a multipath (or which are not influenced by a multipath), and tend not to match at places which are greatly influenced by a multipath (tendency A).

The multipath influence evaluating unit 128 evaluates to what degree GPS positions of all reception satellites being the objects of reception for the GPS receiver 11 are influenced by a multipath influence, based on the above tendency A. More specifically, the multipath influence evaluating unit 128 determines based on a distance between two points of a GPS position and a re-calculated GPS position that a multipath influence is great when the distance is larger than a predetermined value, and determines that a multipath influence is little (or there is no influence) when the distance is smaller than the predetermined value. In addition, the multipath influence evaluating unit 128 makes the determination based on the tendency A per predetermined time.

Next, the tendency B will be described.

Figure 9:
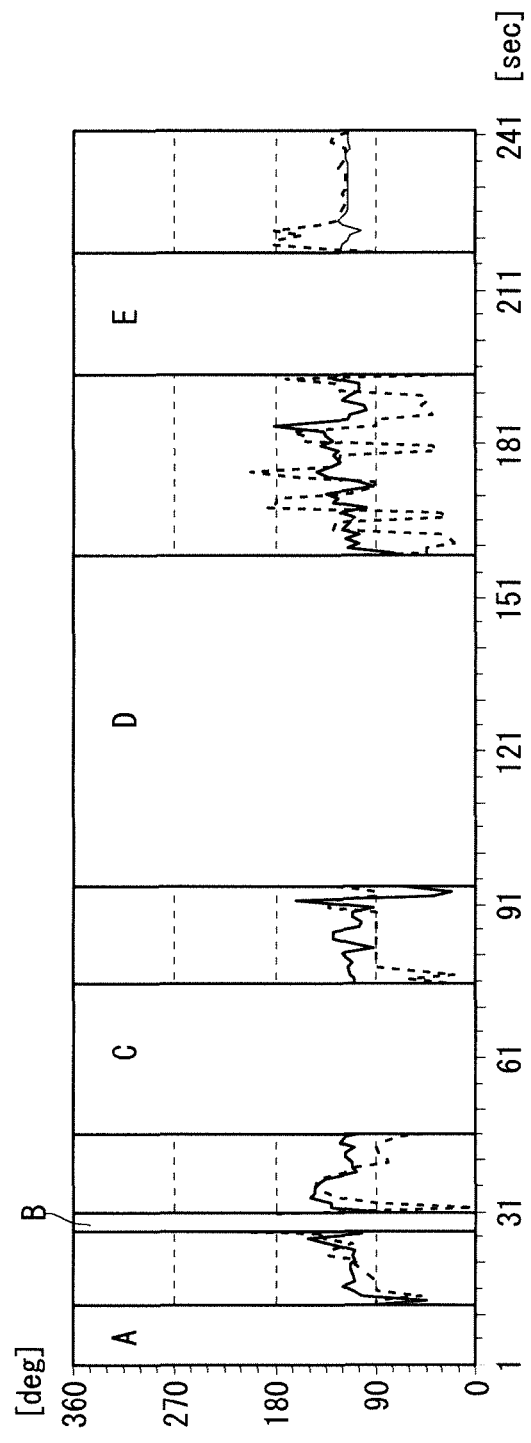
FIG. 9 is a view showing an example of an evaluation on a multipath influence.

FIG. 9 is a view showing an example of comparison between a GPS azimuth which is a moving direction of a GPS position calculated by the GPS receiver 11 and a re-calculated GPS azimuth calculated in step S10 in FIG. 2 by the GPS velocity/azimuth calculating unit 127, and shows that calculation is performed under the same environment as that in FIG. 8 (using the same data as that in FIG. 8). In addition, in FIG. 9, the GPS azimuth is indicated by a broken line, and the re-calculated GPS azimuth is indicated by a solid line. Further, A to D shown in FIG. 9 correspond to the vehicle stop spots A to D in FIG. 8. Variations (fluctuations) of a GPS azimuth and a re-calculated GPS azimuth are significant while the vehicle stops. Therefore, GPS azimuths and re-calculated GPS azimuth at the vehicle stop spots A to D are not shown.

As shown in FIG. 9, the re-calculated GPS azimuth is hardly influenced by a multipath, and fluctuates little. Meanwhile, the GPS azimuth is more susceptible to a multipath influence, and significantly fluctuates. Further, there is a place subsequent to the vehicle stop spot E at which the GPS azimuth and the re-calculated GPS position fluctuate little and match, and it is found that the place is a place at which the multipath influence is little. Thus, GPS azimuths and re-calculated GPS azimuths tend to match at places which are influenced less by a multipath (or which is not influenced by a multipath) when a velocity is higher, and tend not to match at places which are more greatly influenced by a multipath when a velocity is lower (tendency B).

The multipath influence evaluating unit 128 evaluates to what degree GPS azimuths of all reception satellites being the objects of reception for the GPS receiver 11 are influenced by a multipath influence, based on the above tendency B. More specifically, the multipath influence evaluating unit 128 determines based on an azimuth difference between a GPS azimuth and a re-calculated GPS azimuth that a multipath influence is great when the azimuth difference is greater than a predetermined value, and determines that a multipath influence is little (or there is no influence) when the azimuth difference is smaller than the predetermined value. In addition, the multipath influence evaluating unit 128 makes the determination based on the tendency B per predetermined time.

Next, the tendencies C and D will be described.

Figure 10:
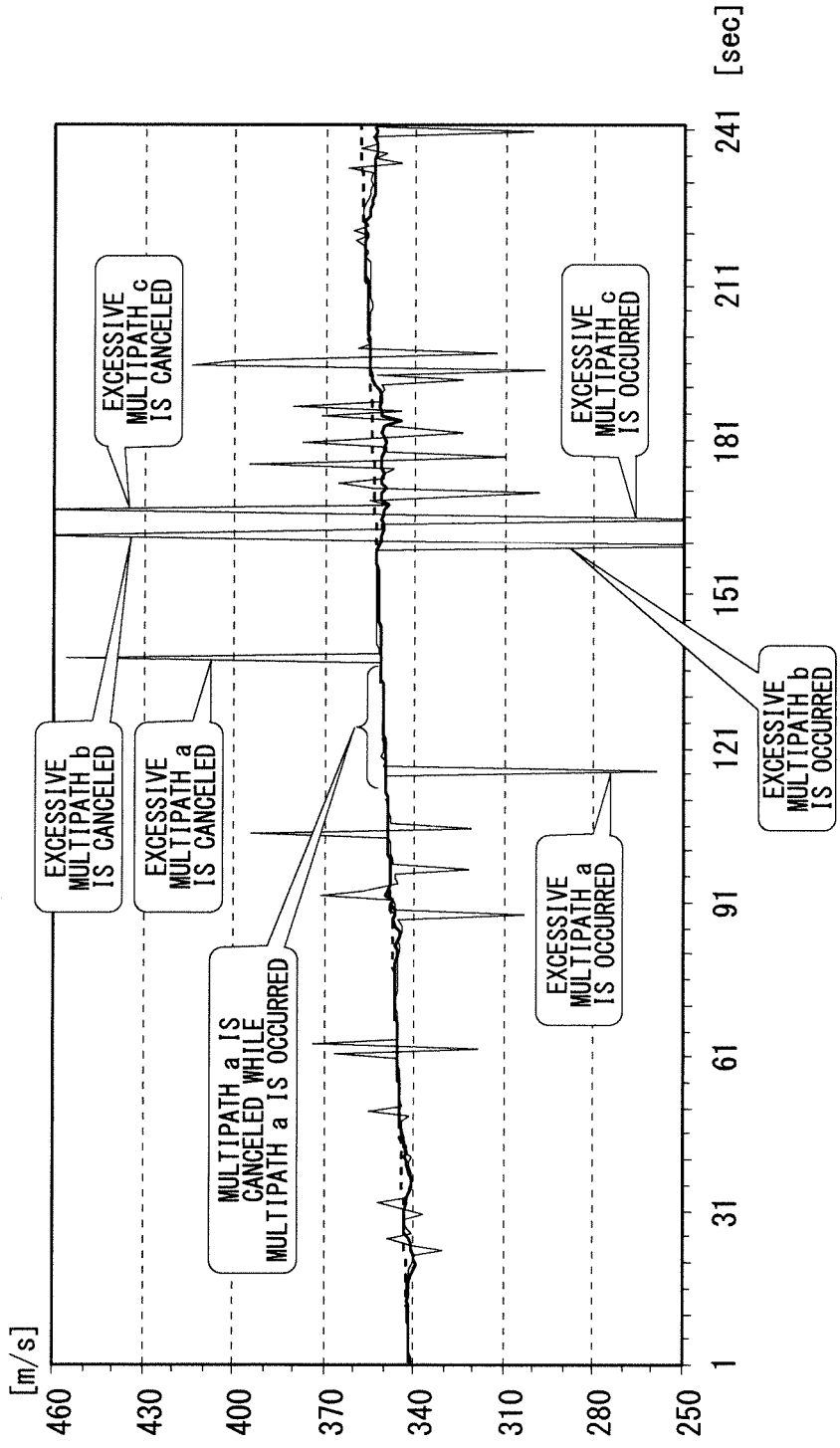
FIG. 10 is a view showing an example of a multipath influence.

FIG. 10 is a view showing time transitions of a delta range, a corrected range rate and a vehicle stop range rate of one satellite being an object of reception for the GPS receiver 11, and shows that calculation is performed under the same environment as that in FIG. 8 (using the same data as that in FIG. 8). In addition, in FIG. 10, the delta range is indicated by a thin solid line, the corrected range rate is indicated by a bold solid line and the vehicle stop range rate is indicated by a broken line.

As shown in FIG. 10, an excessive multipath a is occurred near 115 [sec] on the horizontal axis (vehicle stop spot D in FIG. 8).

Figure 11:
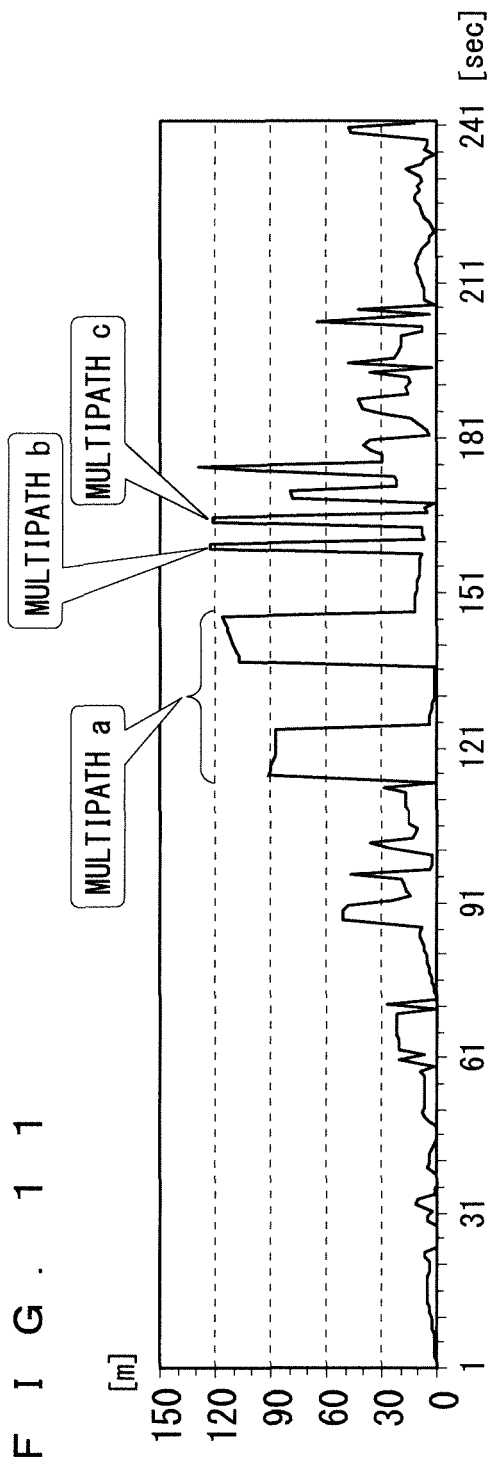
FIG. 11 is a view showing an example of an evaluation on a multipath influence.

FIG. 11 shows a result of calculating a pseudo distance smoothing value obtained by adding a corrected range rate (corrected first range rate) to a pseudo distance in case that a multipath influence evaluated by the multipath influence evaluating unit 128 before a predetermined time is a predetermined value or less in a state shown in FIG. 10, and calculating a difference (absolute value) between the pseudo distance and the pseudo distance smoothing value as an estimated value of the pseudo distance error. Multipaths a to c shown in FIG. 11 correspond to multipaths a to c shown in FIG. 10. In addition, in FIG. 11, the corrected range is added to the pseudo distance before the predetermined time. However, as the time passes, the pseudo distance before the predetermined time is shifted so as not to produce an addition error. That is, the multipath influence evaluating unit 128 re-selects the pseudo distances in case that the evaluated multipath influence is a predetermined level or less after a predetermined time passes.

Figure 12:
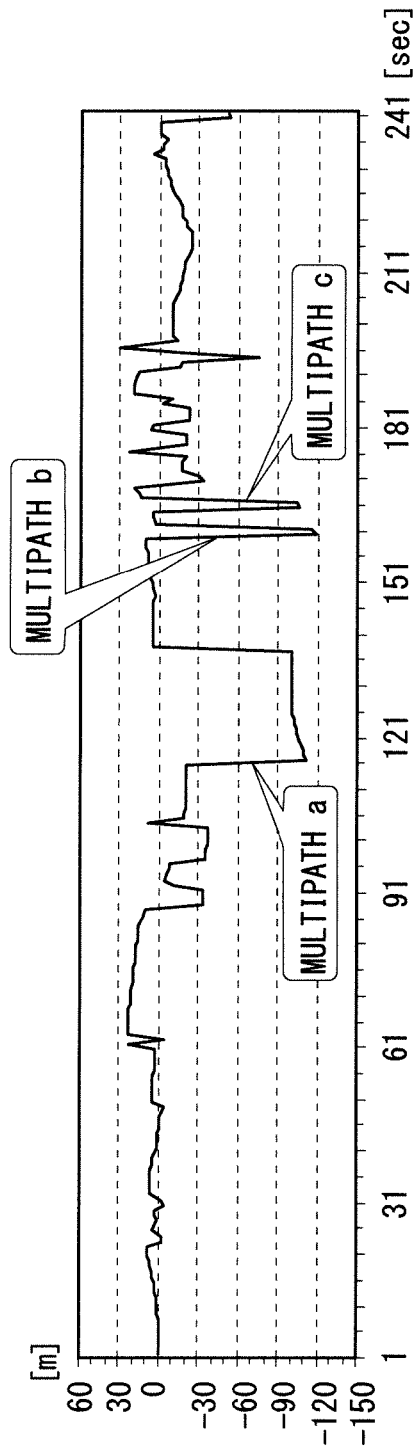
FIG. 12 is a view showing an example of an evaluation on a multipath influence.

Further, following equation (9) is applied in the state shown in FIG. 10. That is, FIG. 12 shows a result of adding a difference $\delta\Delta\rho_{Cr}(t_i)$ between a delta range and a range rate, to the pseudo distance error estimated before a predetermined time, and calculating as an estimated value of a pseudo distance error a value obtained by subtracting from an addition result a predetermined rate k of an average value of differences in a predetermined time (moving average) $\delta\Delta\rho_{Cr-ave}(t_i)$. Multipaths a to c shown in FIG. 12 correspond to the multipaths a to c shown in FIG. 10.

[Mathematical 9]

$$\delta\rho_{Cr}(t_i)=\delta\rho_{Cr}(t_i-1)+(\delta\Delta\rho_{Cr}(t_i)-\delta\Delta\rho_{Cr-ave}(t_i)\cdot k)\Delta t \quad (9)$$

Meanwhile, $$\delta\Delta\rho_{Cr}(t_i)=\Delta\rho_{Cr}(t_i)-\Delta\rho_{rate}(t_i) \ [m/s]$$

Where, $\delta\Delta_{\rho Cr-ave}(t_i)$: Average value of differences between delta ranges and range rates in predetermined time [m/s]

k: Predetermined rate

As shown in FIG. 10, when a multipath of a certain level is occurred for a little while, a significant difference between a delta range and a range rate is produced when a multipath is occurred and when a multipath is canceled. However, it is found that a difference during this time (between when a multipath is occurred and when the multipath is canceled) is little (see, for example, the multipath a).

As to production of such a multipath, as shown in FIG. 11, a difference (pseudo distance error) between a pseudo distance smoothing value to which a range rate which is not directly influenced by a multipath is added, and a pseudo distance calculated from a radio wave propagation time tends to become great when there is a multipath influence (tendency C).

Further, as shown in FIG. 12, an addition value of differences (pseudo distance errors) between delta ranges and rate rates tends to become great when there is a multipath influence (tendency D).

The multipath influence evaluating unit 128 evaluates to what degree a GPS position is influenced by a multipath influence, per reception satellite being an object of reception for the GPS receiver 11 based on the above tendencies C and D. More specifically, the multipath influence evaluating unit 128 determines that a multipath influence is great when the pseudo distance error is larger than a predetermined value, and determines that a multipath influence is little (or there is no influence) when the pseudo distance error is smaller than the predetermined value.

In view of the above, the multipath influence evaluating unit 128 evaluates that there is a multipath influence (there is a significant multipath influence) when one of the tendencies A to D is greater than a predetermined value. That is, the multipath influence evaluating unit 128 evaluates a level of a multipath influence on the GPS positions and the GPS azimuths calculated by the GPS receiver 11, and calculates an index corresponding to the evaluation. More specifically, the index indicates whether or not there is a multipath influence, indicates a multipath influence levelwise (stepwise), quantitatively indicates how many meters an error is (see, for example, FIG. 8) based on a distance between two points, indicates how many degrees an error is (see, for example, FIG. 9) likewise or indicates per satellite how many meters a multipath influences.

Back to FIG. 2, in step S12, the multipath influence evaluating unit 128 evaluates the multipath influence, and finishes processing of the positioning unit 12.

As described above, the navigation device according to the first embodiment can evaluate a level of a multipath influence based on a difference between a GPS position (first moving body position) which is not directly influenced by a multipath influence and a re-calculated GPS position (second moving body position) calculated based on a pseudo distance which is directly influenced by the multipath influence. The navigation device can determine whether, for example, a GPS position is influenced by a multipath influence and therefore fluctuates or a GPS position is not influenced by a multipath influence and is calculated well.

Further, even when a built-in clock error is insufficiently corrected upon GPS positioning calculation performed by the GPS receiver 11, if there is one or more reception satellites, the navigation device can further correct the built-in clock error included in a calculated range rate. Consequently, it is possible to improve accuracy of a re-calculated GPS velocity (moving body velocity) upon low speed driving, and can also improve accuracy of a re-calculated GPS azimuth (moving body azimuth) upon low speed driving. Further, it is possible to estimate a multipath influence by comparing a moving direction (first moving azimuth) of the GPS position and the re-calculated GPS azimuth.

Furthermore, it is possible to estimate a level of a multipath influence per reception satellite based on a difference between a pseudo distance smoothed using a range rate which is not directly influenced by a multipath influence and a pseudo distance which is directly influenced by the multipath influence, and estimate a pseudo distance error even at a place at which a multipath of a certain level is occurred for a little while. Still further, differences between delta ranges and range rates are added to enable correction of an addition error. Consequently, it is possible to estimate a pseudo distance error even at a place at which a multipath of a certain level is occurred for a little while.

For example, in some cases, a GPS position starts gradually deviating while a vehicle stops, and is updated in a good trajectory shape from a position from which the GPS position is deviated after the vehicle starts driving. Even in this case, it is determined that the GPS position is influenced by a multipath. Further, in some cases, on streets which are lined with buildings and which are susceptible to a multipath influence in a wide range, only a narrow place at which a wide view is secured above is not influenced by multipath. However, even in this case, it is possible to determine that a GPS position is not influenced by a multipath.

In addition, a case has been described with the first embodiment where an own vehicle position (re-calculated GPS position) and an own vehicle velocity (re-calculated GPS velocity) are calculated using the weighted least-squares method. However, an own vehicle position and an own vehicle velocity may be calculated using sequential computation or a Kalman filter.

Further, a case has been described where a pseudo distance before a predetermined time is added with subsequent range rates upon calculation of a smoothed pseudo distance. When it is determined that the pseudo distance before the predetermined time is significantly influenced by a multipath, it is possible to change the predetermined time to use a pseudo distance which is influenced less by a multipath without using the pseudo distance which is significantly influenced by the multipath.

Further, a multipath influence on a reception satellite whose pseudo distance whose range rate is added becomes old since the predetermined time passes cannot be accurately determined due to a smoothed pseudo distance error. Therefore, a multipath influence on such a reception satellite after the predetermined time passes may not be determined. Further, a plurality of smoothed pseudo distances may be created for a single reception satellite.

Furthermore, in above equation (9), an average value of differences between delta ranges and range rates in a pre-determined time has been calculated. However, an average value of predetermined distances may be calculated or a low pass filter may be used instead of the average value.

Further, an evaluation based on the above tendencies C and D among evaluations performed on a multipath influence by the multipath influence evaluating unit 128 may be performed between step S10 and step S11 in FIG. 2.

Second Embodiment

Figure 13:
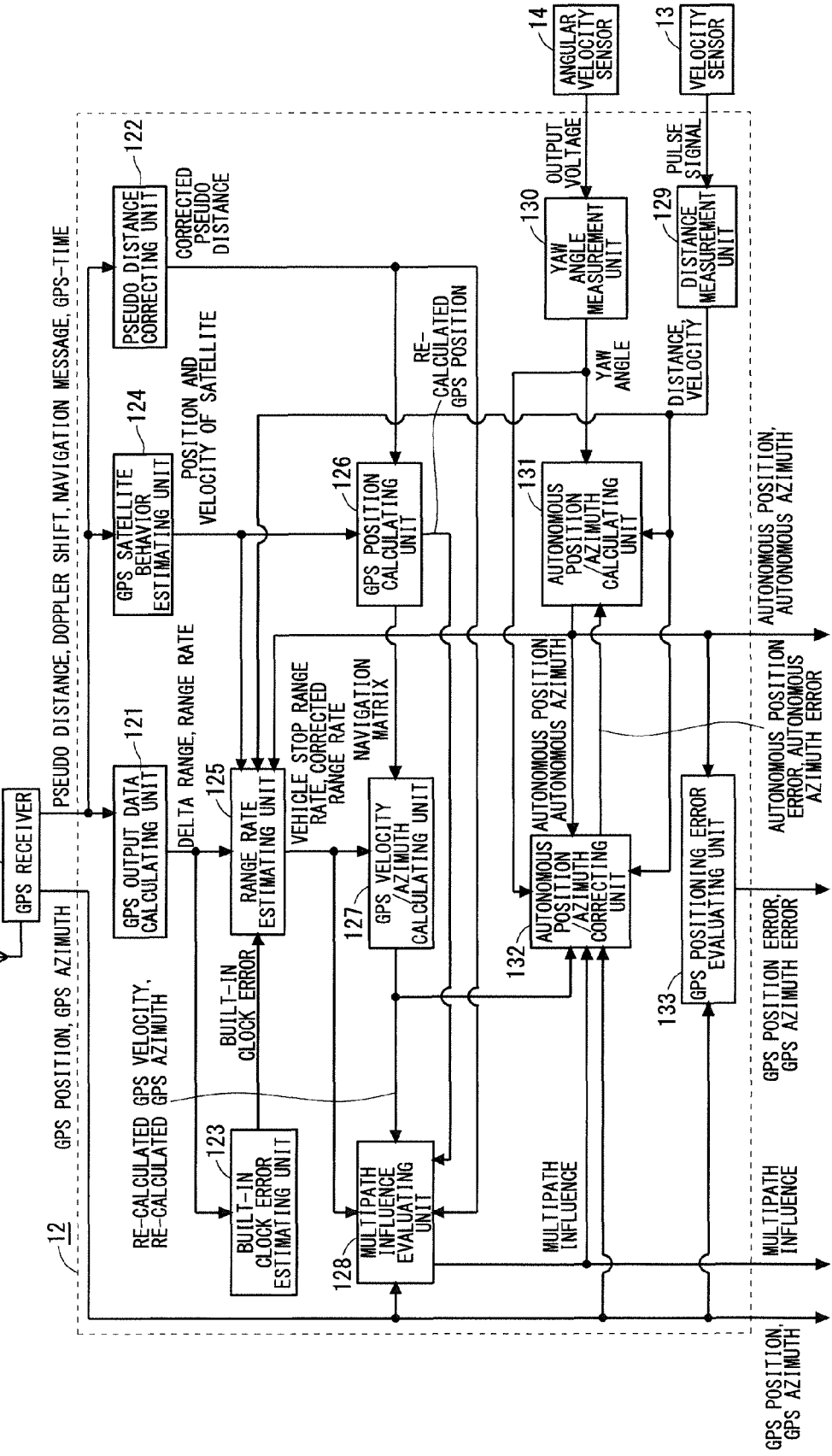
FIG. 13 is a block diagram showing an example of a configuration of a navigation device according to a second embodiment of the present invention.

FIG. 13 is a block diagram showing a configuration required to measure an own vehicle position in a configuration of a navigation device according to a second embodiment of the present invention. The second embodiment is expanded from the first embodiment, and therefore the same portions as those in the first embodiment will not be described and differences will be mainly described.

The navigation device shown in FIG. 13 employs a configuration where a velocity sensor 13 and an angular velocity sensor 14 are added outside a positioning unit 12 of the navigation device shown in FIG. 1, and a distance measurement unit 129, a yaw angle measurement unit 130, an autonomous position/azimuth calculating unit 131, an autonomous position/azimuth correcting unit 132 and a GPS positioning error evaluating unit 133 are added in the positioning unit 12.

The velocity sensor 13 outputs a pulse signal corresponding to a moving distance of a vehicle.

The distance measurement unit 129 measures a moving distance and a velocity along a traveling direction of an own vehicle based on a pulse number of the pulse signals measured per predetermined timing and outputted from the velocity sensor 13.

The angular velocity sensor 14 outputs a voltage corresponding to a yaw rate (yaw angle velocity) of the navigation device.

The yaw angle measurement unit 130 measures a yaw angle (e.g. a rotation angle in left and right directions based on the traveling direction of the own vehicle) based on the voltage (output voltage) measured per predetermined timing and outputted from the angular velocity sensor 14.

The autonomous position/azimuth calculating unit 131 (moving body position/azimuth calculating unit) calculates an autonomous position (third moving body position) and an autonomous azimuth (third moving body azimuth), based on the moving distance measured by the distance measurement unit 129 and the yaw angle measured by the yaw angle measurement unit 130. In this regard, the autonomous position refers to a position of the own vehicle (moving body) calculated based on a sensor measurement result. Further, the autonomous azimuth refers to an azimuth of the own vehicle (moving body) calculated based on a sensor measurement result.

The autonomous position/azimuth correcting unit 132 (moving body position/azimuth correcting unit) corrects the autonomous position and the autonomous azimuth based on the GPS position (first moving body position) and the re-calculated GPS azimuth (second moving body azimuth) whose multipath influence is evaluated by the multipath influence evaluating unit 128 to be little (a predetermined level or less).

The GPS positioning error evaluating unit 133 (moving body position azimuth error calculating unit) calculates a difference between the autonomous position and the GPS position as a GPS position error (first moving body position error) based on the autonomous position, and calculates a difference between the autonomous azimuth and the GPS azimuth as a GPS azimuth error (first moving body azimuth error) based on the autonomous azimuth.

Figure 14:
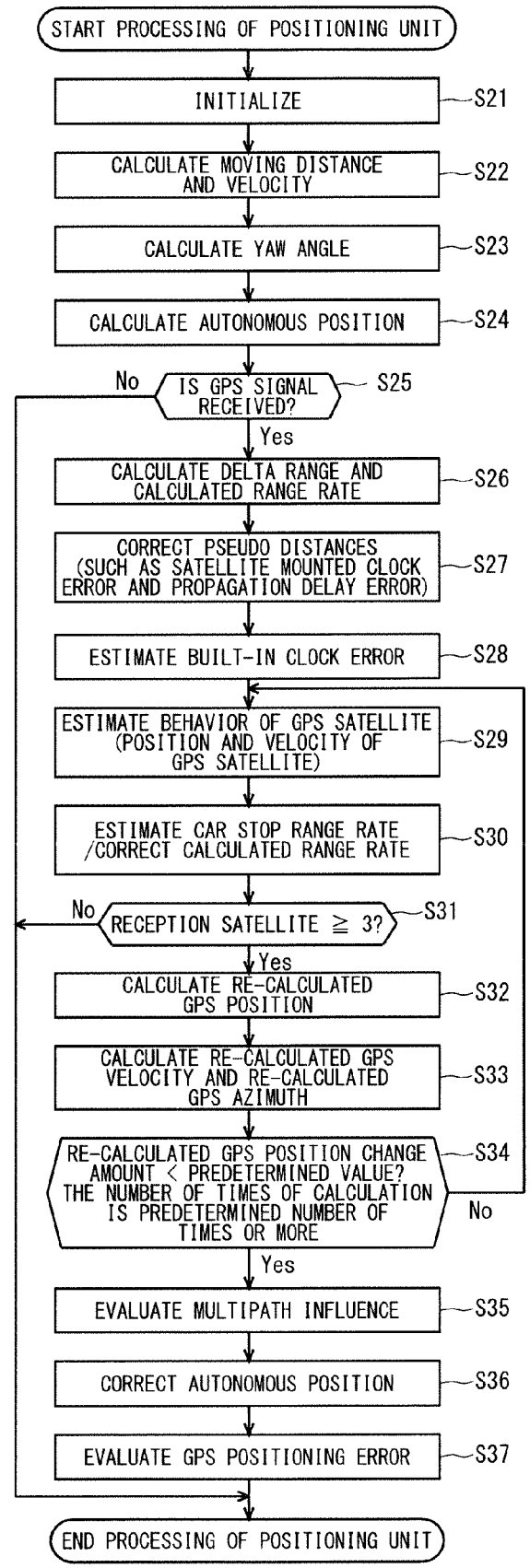
FIG. 14 is a flowchart showing an example of an operation of the navigation device according to the second embodiment of the present invention.

Next, an operation of the navigation device in FIG. 13 will be described with reference to the flowchart in FIG. 14 showing positioning processing performed by the positioning unit 12 per processing cycle. In addition, in the following description of the operation, the same portions as those in the first embodiment will not be described in detail and differences will be described.

In step S21, the navigation device initializes information which needs to be initialized for current positioning processing among information obtained by previous positioning processing. In addition, this initialization may be optionally performed when initialization is required immediately after a power source is activated.

In step S22, the distance measurement unit 129 multiplies a scale factor on the pulse number of the velocity sensor 13 measured per predetermined timing, and measures a moving distance per predetermined timing. Further, the distance measurement unit 129 makes the pulse number of each predetermined timing pass through a low pass filter, and measures the velocity along the traveling direction of the own vehicle per predetermined timing using a value resulting from the filtering.

In step S23, the yaw angle measurement unit 130 multiplies a sensitivity on a value obtained by subtracting a zero voltage from the output voltage of the angular velocity sensor 14 measured per predetermined timing, and calculates (measures) a yaw angle.

In step S24, the autonomous position/azimuth calculating unit 131 calculates a moving amount of the own vehicle (the change amount of the own vehicle position (azimuth)) in the horizontal direction (a direction on a xy plane) based on the moving distance measured in step S22 by the distance measurement unit 129 and the yaw angle measured in step S23 by the yaw angle measurement unit 130. Further, the autonomous position/azimuth calculating unit 131 adds the moving amount to the autonomous position (autonomous azimuth) calculated by previous positioning processing to calculate an addition result as an autonomous position (autonomous azimuth) calculated by current positioning processing.

After step S24, the same operations as those in above step S2 to step S12 (see FIG. 2) are performed in step S25 to step S35.

After step S35, in step S36, the autonomous position/azimuth correcting unit 132 determines a range for detecting an autonomous position error according to a level of a multipath influence evaluated by a multipath influence evaluating unit 128, and calculates autonomous position and autonomous azimuth errors (a latitude, a longitude and an azimuth) based on the GPS position and the re-calculated GPS azimuth in the range. Further, when the calculated errors are a predetermined value or more, the autonomous position/azimuth correcting unit 132 corrects the autonomous position and the autonomous azimuth. In this regard, the reason why the autonomous position/azimuth correcting unit 132 uses a re-calculated GPS azimuth as a reference instead of a GPS azimuth is because a re-calculated GPS azimuth makes it possible to calculate a more accurate azimuth upon at a low speed, and correct the azimuth earlier upon low speed driving. Further, the GPS position is used as a reference herein. However, when the multipath influence evaluating unit 128 determines that a multipath influence is little, one of a GPS position and a re-calculated GPS position may be used as a reference.

Furthermore, the autonomous position/azimuth correcting unit 132 determines that the autonomous position or the autonomous azimuth which is not corrected until an own vehicle drives a predetermined distance or more or a predetermined angle or more is invalid, and determines that the autonomous position or the autonomous azimuth which is corrected until the own vehicle drives the predetermined distance or more or at the predetermined angle or more is valid. Processing of detecting and correcting autonomous position and autonomous azimuth errors will be described below with reference to FIGS. 15 to 17.

In FIG. 15, Ps indicates a driving start spot, and Pa and Pb indicate arbitrary spots. Further, a solid line traveling from the driving start spot Ps to the spot Pa indicates a course on which the own vehicle actually drives, and a broken line traveling from the driving start spot Ps to the spot Pb indicates an autonomous trajectory which is a result of updating the autonomous position and the autonomous azimuth calculated based on the measurement results of the velocity sensor 13 and the angular velocity sensor 14.

As shown in FIG. 15, when the power source of the navigation device is activated, while the own vehicle originally drives from the driving start spot Ps to the spot Pa, an autonomous position is calculated from the driving start spot Ps to the spot Pb in a state where the autonomous azimuth deviates 180 degrees. Thus, when the own vehicle drives with the autonomous azimuth shifted 180 degrees upon start of driving, an autonomous position and an autonomous azimuth of an autonomous trajectory are updated in this error state (straying state). This phenomenon could occur in, for example, a multi-story parking lot. Specific processing of correcting an erroneously updated autonomous trajectory to a GPS trajectory indicating a correct own vehicle trajectory based on a multipath influence will be described.

In FIG. 16, Ps indicates a driving start spot, and Pa and Pb indicate arbitrary spots. Further, a bold broken line traveling from the driving start spot Ps to the spot Pa indicates a GPS trajectory based on a GPS position and a re-calculated GPS azimuth when the multipath influence evaluating unit 128 determines that there is no multipath influence, and a thin broken line traveling from the driving start spot Ps to the spot Pb indicates an erroneously updated autonomous trajectory. Further, circles drawn by broken lines indicate detection ranges of an autonomous position error. The detection ranges (circle sizes) of an autonomous position error are set according to a level of a multipath influence evaluated by the multipath influence evaluating unit 128. That is, when the multipath influence evaluating unit 128 evaluates (determines) that the multipath influence is little (or there is no influence), narrow detection ranges are set (the circles are small), and, when the multipath influence evaluating unit 128 evaluates that the multipath influence is significant, large detection ranges are set.

As shown in FIG. 16, when the multipath influence evaluating unit 128 evaluates that there is no multipath influence near the driving start spot Ps, small detection ranges of an autonomous position error immediately after start of driving are set. Further, when an error in the detection range is a predetermined value or more, an autonomous position on an autonomous trajectory is corrected to the GPS trajectory. Thus, when there is no multipath influence upon start of driving, it is possible to correct the autonomous position immediately after start of driving.

In FIG. 17, Ps indicates a driving start spot, and Pa and Pb indicates arbitrary spots. Further, a bold broken line traveling from the driving start spot Ps to the spot Pa indicates a GPS trajectory based on a GPS position and a re-calculated GPS azimuth when the multipath influence evaluating unit 128 determines that there is little multipath influence, and a thin broken line traveling from the driving start spot Ps to the spot Pb indicates an erroneously updated autonomous trajectory. Further, circles drawn by broken lines indicate detection ranges of an autonomous position error.

As shown in FIG. 17, a multipath influence is significant near the driving start spot Ps, and therefore an autonomous position cannot be corrected. However, on the way from the driving start spot Ps to the spot Pa, the multipath influence evaluating unit 128 determines that a multipath influence is little, and therefore detection ranges are set as shown. Further, when an error in the detection range is a predetermined value or more, an autonomous position on an autonomous trajectory is corrected to the GPS trajectory. Thus, even when there is a significant multipath influence upon start of driving, it is possible to correct the autonomous position after the influence becomes little.

In addition, correcting an autonomous position has been described with reference to above FIGS. 16 and 17. However, the autonomous azimuth can be corrected likewise.

Further, that the autonomous position/azimuth correcting unit 132 corrects an autonomous position and an autonomous azimuth has been described above. However, as shown in FIG. 13, the autonomous position/azimuth correcting unit 132 detects an autonomous position error and an autonomous azimuth error and feeds back these errors to the autonomous position/azimuth calculating unit 131, and the autonomous position/azimuth calculating unit 131 may correct the autonomous position and the autonomous azimuth based on the errors.

Back to FIG. 14, in step S37, the GPS positioning error evaluating unit 133 calculates a difference between the corrected autonomous position and a GPS position as a GPS position error when the corrected autonomous position is valid. Further, the GPS positioning error evaluating unit 133 calculates a difference between the corrected autonomous azimuth and a GPS azimuth as a GPS azimuth error likewise when the corrected autonomous azimuth is valid.

After step S37, processing of the positioning unit 12 is finished.

As described above, the navigation device according to the second embodiment can reliably detect and correct autonomous position and autonomous azimuth errors early by changing ranges for calculating the autonomous position and autonomous azimuth errors according to a level of a multipath influence.

Further, it is possible to quantitatively estimate GPS position and GPS azimuth errors in real time based on the corrected autonomous position and autonomous azimuth.

Further, it is possible to determine validity of the autonomous position or the autonomous azimuth. Consequently, it is possible to obtain a highly reliable GPS position error or GPS azimuth error and prevent use of a less reliable GPS position error or GPS azimuth error.

In addition, setting ranges for detecting an autonomous position error according to a multipath influence, and calculating autonomous position and autonomous azimuth errors based on a GPS position and a re-calculated GPS azimuth in the ranges have been described in the second embodiment. However, when a multipath influence is greater than a predetermined value, autonomous position and autonomous azimuth errors may not be calculated, and, when a velocity is a predetermined value or less even though there is no multipath influence, autonomous position and autonomous azimuth errors may not be calculated.

The ranges for detecting an autonomous position error may be set as a time or a distance. Further, taking into account validity of an autonomous position and an autonomous azimuth, a detection range may be set to a wide range when the autonomous position or the autonomous azimuth is valid, and a detection range may be set to a narrow range when the autonomous position or the autonomous azimuth is invalid.

Correcting an autonomous position has been described with reference to above FIGS. 16 and 17. However, the autonomous azimuth can be corrected likewise.

That the autonomous position/azimuth correcting unit 132 corrects an autonomous position and an autonomous azimuth has been described above. However, as shown in FIG. 13, the autonomous position/azimuth correcting unit 132 may detect an autonomous position error and an autonomous azimuth error, and the autonomous position/azimuth calculating unit 131 may correct the autonomous position and the autonomous azimuth based on the errors.

When a state where, when an azimuth deviation is caused due to a temperature drift of the angular velocity sensor 14, the GPS positioning error evaluating unit 133 cannot correct the deviation based on a GPS position and a GPS azimuth continues for predetermined conditions or more, autonomous position and autonomous azimuth errors gradually become great. However, the autonomous position and the autonomous azimuth in this case may be invalidated. By so doing, inaccurate GPS position error and GPS azimuth error may not be calculated.

Third Embodiment

Figure 18:
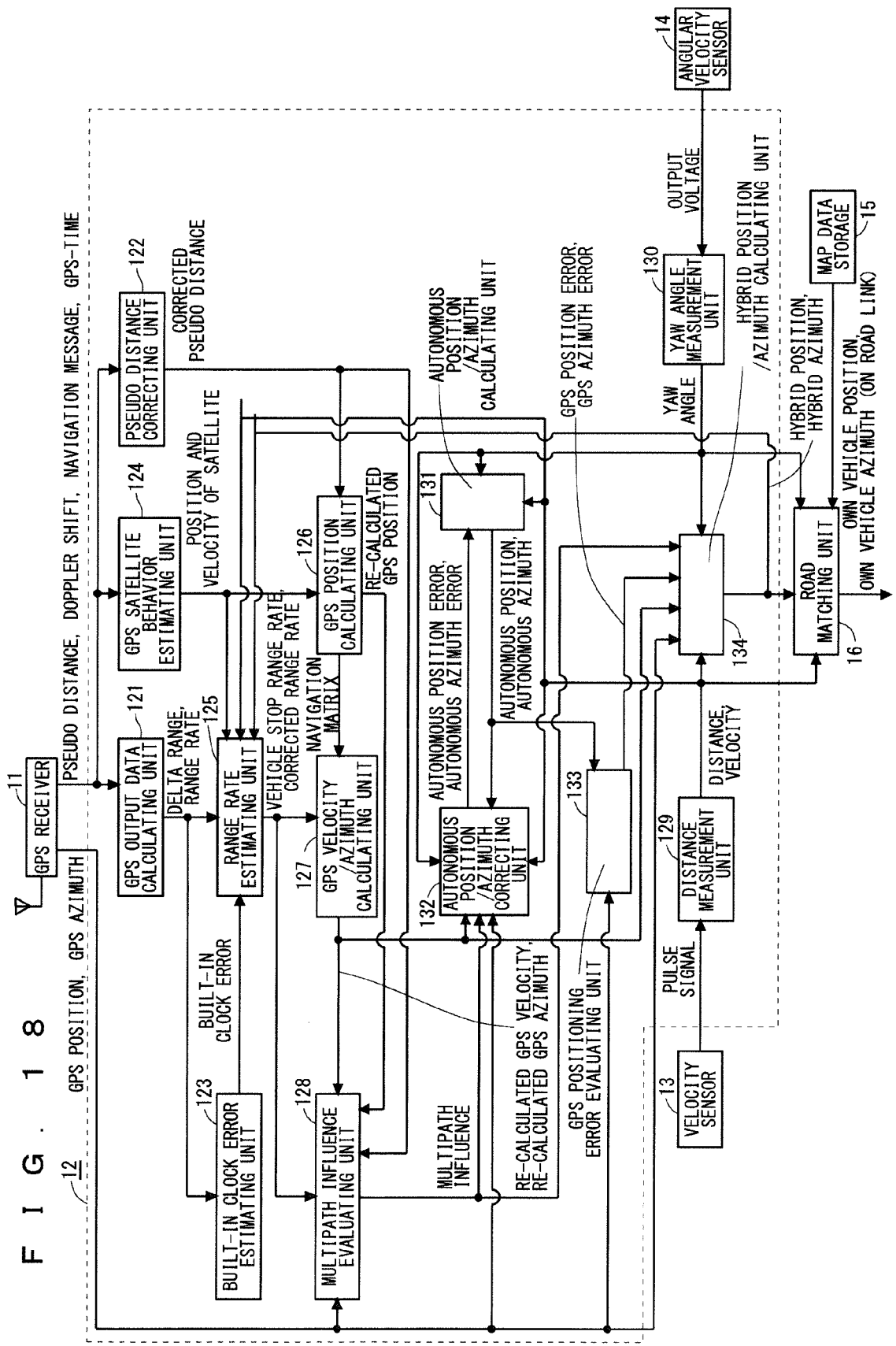
FIG. 18 is a block diagram showing an example of a configuration of a navigation device according to a third embodiment of the present invention.

FIG. 18 is a block diagram showing a configuration required to measure an own vehicle position in a configuration of a navigation device according to a third embodiment of the present invention. The third embodiment is expanded from the second embodiment, and therefore the same portions as those in the second embodiment will not be described and differences will be mainly described.

The navigation device shown in FIG. 18 employs a configuration where a map data storage 15 and a road matching unit 16 are added outside a positioning unit 12 of the navigation device shown in FIG. 13, and a hybrid position/azimuth calculating unit 134 are added in the positioning unit 12.

The hybrid position/azimuth calculating unit 134 updates a hybrid position and a hybrid azimuth based on a moving distance measured by a distance measurement unit 129 and a yaw angle measured by a yaw angle measurement unit 130, and corrects the hybrid position and the hybrid azimuth based on a GPS position and a re-calculated GPS azimuth.

In this regard, the hybrid position (fourth moving body position) refers to a position calculated by optionally correcting an autonomous position based on a GPS position (a re-calculated GPS position may also be used). In this regard, the hybrid azimuth (fourth moving body azimuth) refers to an azimuth calculated by optionally correcting an autonomous azimuth based on a re-calculated GPS azimuth (a GPS azimuth may also be used).

The map data storage 15 stores map data including data indicating linear shapes and road links represented by coordinate points.

The road matching unit 16 reads a road link from the map data storage 15 based on the hybrid position and the hybrid azimuth of a own vehicle measured by the positioning unit 12, and identifies (map-matches) the own vehicle position on the road link. Details of the map matching processing based on hybrid positioning and a hybrid position are disclosed in, for example, Japanese Patent No. 3745165 or Japanese Patent No. 4795206. The map matching processing may be used in the present invention.

Figure 20:
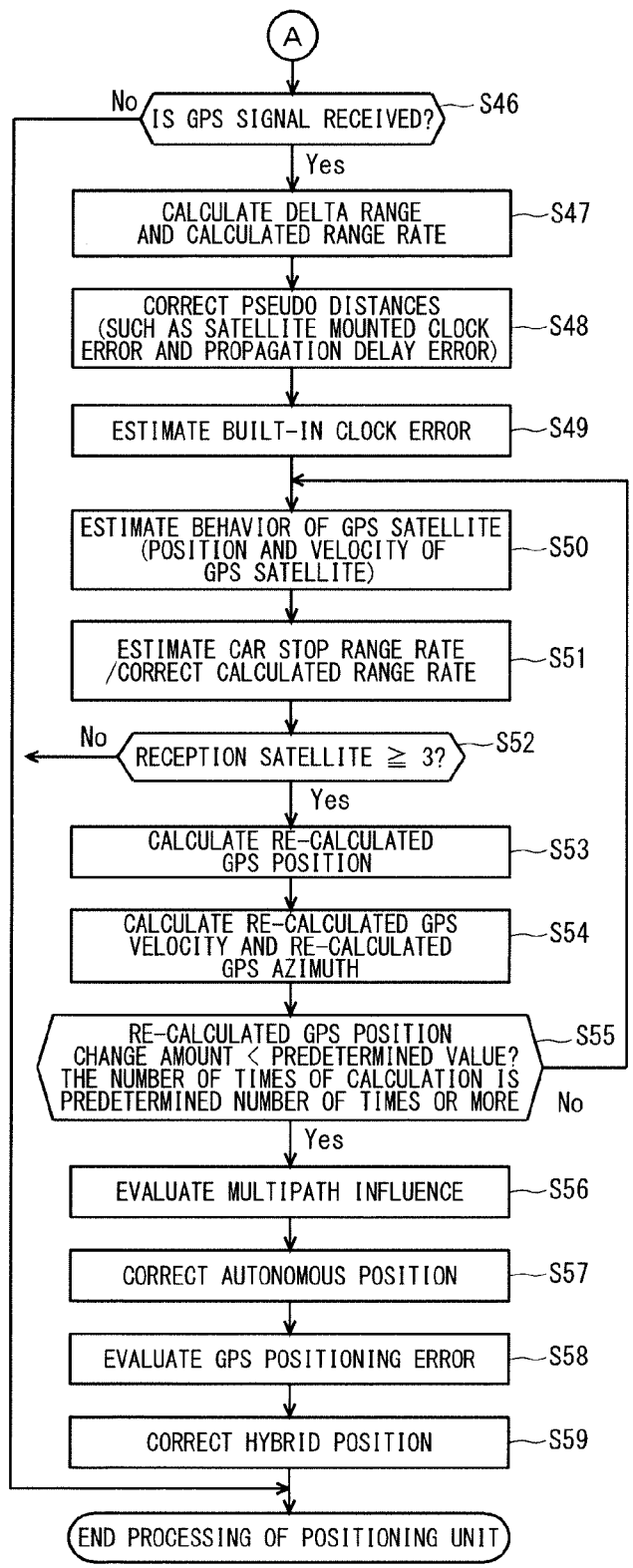
FIG. 20 is a flowchart showing an example of an operation of the navigation device according to the third embodiment of the present invention.

Next, an operation of the navigation device in FIG. 18 will be described with reference to the flowcharts in FIGS. 19 and 20 showing positioning processing performed by the positioning unit 12 per processing cycle. In addition, in the following description of the operation, the same portions as those in the second embodiment will not be described in detail and differences will be mainly described.

The same operations as those in above step S21 to step S24 (see FIG. 14) are performed in step S41 to step S44.

After step S44, in step S45, the hybrid position/azimuth calculating unit 134 calculates moving amounts of an autonomous position and an autonomous azimuth based on the moving distance measured by the distance measurement unit 129 and the yaw angle measured by the yaw angle measurement unit 130 per predetermined timing, adds the moving amounts to the hybrid position and the hybrid azimuth calculated by previous positioning processing, and updates the hybrid position and the hybrid azimuth to a new hybrid position and hybrid azimuth.

After step S45, the same operations as those in above step S25 to step S37 (see FIG. 14) are performed in step S46 to step S58.

After step S58, in step S59, the hybrid position/azimuth calculating unit 134 corrects the hybrid position and the hybrid azimuth based on a GPS position error and a GPS azimuth error in case that the autonomous position and the autonomous azimuth are valid, a GPS position and a re-calculated GPS azimuth (or a GPS azimuth), and an evaluation performed by a multipath influence evaluating unit 128.

After step S59, processing of the positioning unit 12 is finished.

A difference between an autonomous position and a hybrid position will be described below with reference to FIG. 21.

Figure 21:
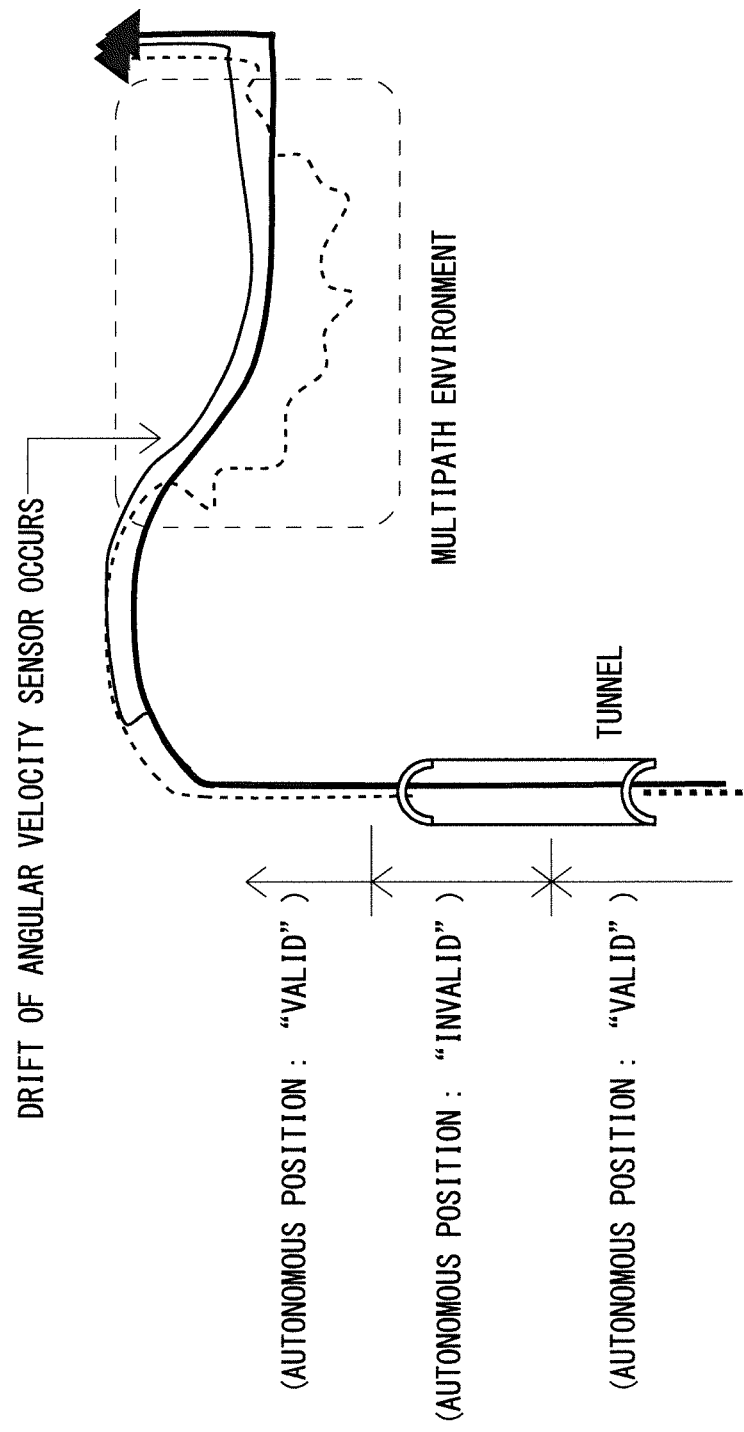
FIG. 21 is a view for explaining a hybrid position.

In FIG. 21, a trajectory in case that a GPS position is updated is indicated by a broken line, a trajectory in case that an autonomous position is updated is indicated by a thin solid line, and a trajectory in case that a hybrid position is updated is indicated by a bold solid line.

As shown in FIG. 21, at a place such as a tunnel at which GPS positioning cannot be performed, an autonomous position and a hybrid position are updated based on the same moving distance and yaw angle. In addition, a state where the autonomous positions in FIG. 21 are "valid" refers to a state where autonomous positions are corrected as described in the second embodiment. A state where an autonomous position is "invalid" refers to a state where the autonomous position is not corrected.

A straight zone immediately after a tunnel assumes environment without a multipath influence (environment of an open sky). A GPS position is accurate at this place, and therefore the autonomous position and the hybrid position are corrected based on the GPS position.

There is a moderate curved road after a right turn subsequent to a straight zone, and the GPS position deviates forward (in an upper direction in FIG. 21) upon the right turn. In this case, when an error (GPS position error) between an autonomous position and a GPS position is calculated, while the autonomous position is immediately corrected to match with the coordinate (position) indicated by the GPS position, the hybrid position is calculated to gradually come close to a GPS position by the amount corresponding to the GPS position error and sensor errors (the moving distance and the yaw angle). In addition, when the hybrid position is in a straying state (a state where an own vehicle is driving at a position or in a direction different from the original position or direction), the autonomous position is corrected and, at the same time, the hybrid position is also corrected. In this regard, the sensor errors are calculated by the hybrid position/azimuth calculating unit 134. That is, the sensor errors are predetermined rates of the moving distance and the yaw angle inputted from the distance measurement unit 129 and the yaw angle measurement unit 130, and are compensated by the GPS position error and the GPS azimuth error outputted from a GPS positioning error evaluating unit 133.

A latter portion of the curved road assumes environment with a multipath influence, and a GPS position is influenced by the multipath and indicates a trajectory different from an original own vehicle behavior. In this case, when the multipath influence evaluating unit 128 evaluates that there is a significant multipath influence, there is no GPS position used to correct an autonomous position, and therefore the autonomous position is updated based on the moving distance and the yaw angle similar to a time when the own vehicle is driving in the tunnel even during GPS positioning. In this case, correction processing (not shown) becomes insufficient due to occurrence of a temperature drift in an angular velocity sensor 14, an autonomous azimuth error gradually becomes significant. Meanwhile, the hybrid position is corrected toward the GPS position by the amount corresponding to the sensor errors and the GPS error.

When there is no multipath influence at a place at which the own vehicle turns left after the curved road, the autonomous position and the hybrid position are corrected based on the GPS position.

As described above, the autonomous position is updated by the sensors, and, while the autonomous position can be corrected based on the GPS position when a multipath influence is little, the autonomous position cannot be corrected based on the GPS position when the multipath influence is significant. Further, when a state where a temperature drift occurs in the angular velocity sensor continues, a GPS position error based on the autonomous position becomes inaccurate. Hence, the autonomous position is insufficient under the multipath influence, and therefore the hybrid position is used to deal with such a problem.

The autonomous position is optionally corrected based on a GPS position, and the hybrid position is corrected to gradually come close to the GPS position according to a GPS position error and sensor errors. Thus, the hybrid position is more accurate than the autonomous position and the GPS position. Consequently, while accuracy of the GPS position decreases under environment with a multipath influence, the hybrid position can be used instead of the GPS position to compensate for the decrease in accuracy.

As described above, the navigation device according to the third embodiment can obtain an optimally calculated hybrid position based on a GPS position, a re-calculated GPS azimuth, a moving distance and a yaw angle, and errors of the GPS position, the re-calculated GPS azimuth, the moving distance and the yaw angle. Further, it is possible to determine reliability of the hybrid position based on reliability of the autonomous position. Furthermore, when the autonomous position is valid, it is possible to more accurately correct a display position and display candidate positions based on a reliable hybrid position and a hybrid azimuth independently from map matching, and hybrid position and hybrid azimuth errors. Consequently, it is possible to not only increase accuracy of a own vehicle position but also discover and correct erroneous matching (an error of map matching) earlier.

In addition, the embodiments of the present invention can be freely combined within the scope of the invention or optionally modified or omitted.

REFERENCE SIGNS LIST

11 GPS receiver
12 Positioning unit
13 Velocity sensor
14 Angular velocity sensor
15 Map data storage
16 Road matching unit
121 GPS output data calculating unit
122 Pseudo distance correcting unit
123 Built-in clock error estimating unit
124 GPS satellite behavior estimating unit
125 Range rate estimating unit
126 GPS position calculating unit
127 GPS velocity/azimuth calculating unit
128 Multipath influence evaluating unit
129 Distance measurement unit
130 Yaw angle measurement unit
131 Autonomous position/azimuth calculating unit
132 Autonomous position/azimuth correcting unit
133 GPS positioning error evaluating unit
134 Hybrid position/azimuth calculating unit

The invention claimed is:

1. A positioning device comprising:
a first moving body position calculating unit that receives transmission signals transmitted from a plurality of GPS satellites, obtains pseudo distances to said GPS satellites and a Doppler shift based on the transmission signals, and calculates a first moving body position that is a position of a moving body, based on said obtained pseudo distances and said obtained Doppler shift;
a second moving body position calculating unit that calculates a second moving body position that is the position of said moving body, based on said pseudo distances;
a multipath influence evaluating unit that evaluates an influence of a multipath on said first moving body position based on a difference between said first moving body position calculated by said first moving body position calculating unit and said second moving body position calculated by said second moving body position calculating unit;
a calculating unit that calculates a time difference between said pseudo distances as a delta range, and calculates a first range rate based on said Doppler shift of said transmission signals;
a built-in clock error estimating unit that estimates an error of a built-in clock of said moving body as a built-in clock error based on a difference between said delta range and said first range rate;
a range rate estimating unit that estimates a second range rate in case that said moving body stops, based on positions and velocities of said GPS satellites based on said transmission signals and said second moving body position, and corrects said first range rate calculated by said calculating unit, based on said built-in clock error; and
a moving body velocity/azimuth calculating unit that calculates a velocity of said moving body and a second moving body azimuth that is an azimuth of said moving body, based on positions of said GPS satellites based on said transmission signals and said second moving body position, said second rage rate estimated by said range rate estimating unit and said first range rate corrected by said range rate estimating unit,
wherein said multipath influence evaluating unit evaluates the influence of the multipath on said first moving body position based on a difference between a first moving body azimuth that is a moving direction of said first moving body position and said second moving body azimuth.

2. The positioning device according to claim 1, wherein said multipath influence evaluating unit calculates pseudo distance smoothing values obtained by adding said first range rate to said pseudo distances in case that said evaluated influence of the multipath is a predetermined level or less, and evaluates the influence of the multipath per GPS satellite based on a pseudo distance error that is a difference between said pseudo distances and said pseudo distance smoothing values.

3. The positioning device according to claim 2, wherein said multipath influence evaluating unit re-selects said pseudo distances in case that said evaluated influence of the multipath is a predetermined level or less after a predetermined time passes.

4. The positioning device according to claim 1, wherein said multipath influence evaluating unit adds a difference between said delta range and said first range rate, and evaluates the influence of the multipath per GPS satellite based on errors of said pseudo distances calculated by subtracting from an addition result a predetermined rate of a moving average of said difference.

5. The positioning device according to claim 1, further comprising:
a velocity sensor that outputs a pulse signal corresponding to a moving distance of said moving body;
a distance measurement unit that measures at least a moving distance of said moving body based on said pulse signal outputted from said velocity sensor;
an angular velocity sensor that outputs a voltage corresponding to a yaw rate of said positioning device;

a yaw angle measurement unit that measures a yaw angle based on the voltage outputted from said angular velocity sensor;

a moving body position/azimuth calculating unit that calculates a third moving body position that is a position of said moving body and a third moving body azimuth that is an azimuth direction of said moving body, based on said moving distance measured by said distance measurement unit and said yaw angle measured by said yaw angle measurement unit; and a moving body position/azimuth correcting unit that corrects said third moving body position and said third moving body azimuth based on said first moving body position and said second moving body azimuth in case that said multipath influence evaluating unit evaluates that the influence of the multipath is the predetermined level or less.

6. The positioning device according to claim 5, further comprising a moving body position/azimuth error calculating unit that calculates a difference between the third moving body position and said first moving body position as a first moving body position error based on said third moving body position corrected by said moving body position/azimuth correcting unit, and calculates a difference between the third moving body azimuth and said first moving body azimuth as a first moving body azimuth error based on said third moving body azimuth corrected by said moving body position/azimuth correcting unit.

7. The positioning device according to claim 5, wherein said moving body position/azimuth correcting unit determines that said third moving body position or said third moving body azimuth that is not corrected until driving is performed a predetermined distance or more or a predetermined angle or more is invalid, and determines that said third moving body position or said third moving body azimuth that is corrected until driving is performed the predetermined distance or more or the predetermined angle or more is valid.

8. The positioning device according to claim 7, further comprising a hybrid position/azimuth calculating unit that updates a fourth moving body position and a fourth moving body azimuth based on said moving distance measured by said distance measurement unit and said yaw angle measured by said yaw angle measurement unit, and corrects said fourth moving body position and said fourth moving body azimuth based on a first moving body position error and a first moving body azimuth error in case that said third moving body position and said third moving body azimuth are valid, said first moving body position and said first moving body azimuth, and said evaluation of said multipath influence evaluating unit.

9. The positioning device according to claim 8, further comprising a road matching unit that identifies the position of said moving body on a road link on a map based on said fourth moving body position and said fourth moving body azimuth calculated by said hybrid position/azimuth calculating unit.

* * * * *